US012645767B2

(12) United States Patent
Flöther et al.

(10) Patent No.: US 12,645,767 B2
(45) Date of Patent: Jun. 2, 2026

(54) WATERMARKING QUANTUM MODELS BY LEVERAGING METADATA

(71) Applicant: International Business Machines Corporation, Armonk, NY (US)

(72) Inventors: Frederik Frank Flöther, Schlieren (CH); Matthias Biniok, Marburg (DE); Shikhar Kwatra, San Jose, CA (US); Vladimir Rastunkov, Mundelein, IL (US)

(73) Assignee: International Business Machines Corporation, Armonk, NY (US)

( * ) Notice: Subject to any disclaimer, the term of this patent is extended or adjusted under 35 U.S.C. 154(b) by 1042 days.

(21) Appl. No.: 17/747,175

(22) Filed: May 18, 2022

(65) Prior Publication Data

US 2023/0376577 A1    Nov. 23, 2023

(51) Int. Cl.
| | |
|---|---|
| *G06F 21/16* | (2013.01) |
| *G06F 21/60* | (2013.01) |
| *G06N 10/80* | (2022.01) |

(52) U.S. Cl.
CPC ............ *G06F 21/16* (2013.01); *G06F 21/602* (2013.01); *G06N 10/80* (2022.01)

(58) Field of Classification Search
CPC ....... G06F 21/16; G06F 21/602; G06N 10/80; G06N 10/60
See application file for complete search history.

(56) References Cited

U.S. PATENT DOCUMENTS

| | | | |
|---|---|---|---|
| 7,663,670 B1 * | 2/2010 | Orboubadian | ....... H04N 9/8042 |
| | | | 348/231.2 |
| 11,042,611 B2 | 6/2021 | Zatloukal | |
| 2002/0106084 A1 * | 8/2002 | Azuma | ................. H04L 9/0852 |
| | | | 380/263 |
| 2019/0205508 A1 | 7/2019 | Poddar et al. | |
| 2021/0019605 A1 | 1/2021 | Rouhani et al. | |
| 2022/0121979 A1 * | 4/2022 | Gonthier | ................ G06N 10/60 |

FOREIGN PATENT DOCUMENTS

| | | |
|---|---|---|
| CN | 103366334 A | 10/2013 |
| CN | 104715442 B | 12/2017 |
| CN | 107256529 B | 7/2020 |
| CN | 112801845 A | 5/2021 |
| CN | 113628092 A | 11/2021 |

(Continued)

OTHER PUBLICATIONS

Hemida O, He H. A self-recovery watermarking scheme based on block truncation coding and quantum chaos map. Multimedia Tools and Applications. Jul. 2020;79(25):18695-725. (Year: 2020).*

(Continued)

*Primary Examiner* — Oluwatosin Alabi
(74) *Attorney, Agent, or Firm* — Joseph P. Curcuru

(57)    ABSTRACT

A computer-implemented method, system and computer program product for watermarking quantum models. A precision for a parameter of a quantum model on a quantum computer is determined. The parameter is then truncated based on the determined precision. Furthermore, the watermark is appended in one or more positions of truncated portion of the truncated parameter. In this manner, watermarking quantum models, such as quantum machine learning models, is achieved.

20 Claims, 9 Drawing Sheets

(56) References Cited

FOREIGN PATENT DOCUMENTS

| | | | |
|---|---|---|---|
| CN | 113962839 | A | 1/2022 |
| DE | 112022004921 | T5 | 8/2024 |
| EP | 4500408 | A1 | 2/2025 |
| GB | 2627624 | A | 8/2024 |
| JP | 2024-531084 | A | 8/2024 |
| WO | 2023/098433 | A1 | 6/2023 |
| WO | 2023/222576 | A1 | 11/2023 |

OTHER PUBLICATIONS

Dai JY, Ma Y, Zhou NR. Quantum multi-image compression-encryption scheme based on quantum discrete cosine transform and 4D hyper-chaotic Henon map. Quantum Information Processing. Jul. 2021;20(7):246. (Year: 2021).*

Li P, Zhao Y, Xiao H, Cao M. An improved quantum watermarking scheme using small-scale quantum circuits and color scrambling. Quantum Information Processing. May 2017;16(5):127. (Year: 2017).*

Iliyasu AM, Le PQ, Dong F, Hirota K. Watermarking and authentication of quantum images based on restricted geometric transformations. Information Sciences. Mar. 1, 2012;186(1):126-49. (Year: 2012).*

Saravanan et al., "Decomposition-Based Watermarking of Quantum Circuits," 22nd International Symposium on Quality Electronic Design, Apr. 7, 2021, pp. 73-78.

Phalak et al., "Quantum PUF for Security and Trust in Quantum Computing," IEEE Journal on Emerging and Selected Topics in Circuits and Systems, vol. 11, No. 2, Jun. 2021, pp. 333-342.

Kundu et al., Security Aspects of Quantum Machine Learning: Opportunities, Threats and Defenses (Invited), arXiv:2204.03625v1, Apr. 7, 2022, pp. 1-6.

Saki et al., "A Survey and Tutorial on Security and Resilience of Quantum Computing," 26th IEEE European Tet Symposium, 2021, pp. 1-10.

International Search Report and the Written Opinion of the International Searching Authority for International Application No. PCT/EP2023/062915 dated Aug. 28, 2023, pp. 1-16.

Zhang et al., "Protecting Intellectual Property of Deep Neural Networks with Watermarking," Asia CCS'18, Incheon, Republic of Korea, Jun. 4-8, 2018, pp. 1-13.

Li et al., "A Survey of Deep Neural Network Watermarking Techniques," arXiv:2103.09274v1, Mar. 16, 2021, pp. 1-22.

Franziska Boenisch, "A Systematic Review on Model Watermarking for Neural Networks," arXiv:2009.12153v2, Dec. 8, 2021, pp. 1-19.

Wang et al., "Detect and Remove Watermark in Deep Neural Networks via Generative Adversarial Networks," arXiv:2106.08104v1, Jun. 15, 2021, pp. 1-8.

Yu et al., "Statistical Methods for Quantum State Verification and Fidelity Estimation," arXiv:2109.10805v1, Sep. 22, 2021, pp. 1-23.

Weber et al., "Optimal Provable Robustness of Quantum Classification via Quantum Hypothesis Testing," Nature Partner Journals Quantum Information, vol. 7, No. 76, 2021, pp. 1-12.

Guan et al., "Robustness Verification of Quantum Classifiers," arXiv:2008.07230v2, May 31, 2021, pp. 1-32.

Ying et al., "Model Checking Quantum Systems—A Survey," arXiv.1807.09466v1, Jun. 25, 2018, pp. 1-4.

Mingsheng Ying, "Model Checking for Verification of Quantum Circuits," arXiv:2104.11359v1, Apr. 23, 2021, pp. 1-16.

Gheorghiu et al., "Verification of Quantum Computation: An Overview of Existing Approaches," Theory of Computing Systems, vol. 63, 2019, pp. 715-808.

Podilchuk et al., "Digital Watermarking: Algorithms and Applications," IEEE Signal Processing Magazine, vol. 18, No. 4, Jul. 2001, pp. 33-46.

Huang et al., "Power of Data in Quantum Machine Learning," Nature Communications, vol. 12, 2021, pp. 1-9.

Harper et al., "Efficient Learning of Quantum Noise," arXiv:1907.13022v2, Apr. 16, 2021, pp. 1-23.

Weigold et al., "Data Encoding Patterns for Quantum Computing," 20th Conference on Pattern Languages of Programs, Keystone, Colorado, USA, Oct. 24-26, 2020, pp. 1-10.

Weigold et al., "Expanding Data Encoding Patterns for Quantum Algorithms," International Conference on Software Architecture Companion, 2021, pp. 95-101.

* cited by examiner 301          302

| θ | θ' |
|---|---|
| 1.1920849081903 68 | 1.192 |
| 1.11524440950008 02 | 1.115 |
| 0.719109927157422 | 0.719 |
| 0.5453880893881514 | 0.545 |
| 0.9031730381025252 | 0.903 |
| 0.7515154651015765 | 0.752 |
| 0.44980730709161154 | 0.450 |
| 0.469319023958311 | 0.469 |

500

| 501 | 502<br>d_theta | 503<br>p_value |
|---|---|---|
|  | 0.007854 | 1.000000e+00 |
| 0 | 0.015708 | 2.446412e-01 |
| 2 | 0.023562 | 1.000000e+00 |
| 3 | 0.031416 | 4.833337e 02 |
| 4 | 0.039270 | 1.819131e-01 |
| 5 | 0.047124 | 5.388405e-01 |
| 6 | 0.054978 | 332695e-01 |
| 7 | 0.062832 | 3.363816e-02 |
| 8 | 0.070686 | 7.107038e-03 |
| 9 | 0.078540 | 5.321501e-04 |
| 10 | 0086394 | 3.090572e-03 |
| 11 | 0.094248 | 1.301353e-03 |
| 12 | 0.102102 | 1.162775e-05 |
| 13 | 0.109956 | 1.087122e-07 |
| 14 | 0.117810 | 1.087122e-07 |
| 15 | 0.125664 | 4.176292e-12 |
| 16 | 0.133518 | 3.158885e -07 |
| 17 | 0.141372 | 7.065204e-13 |
| 18 | 0.149226 | 7.065204e-13 |
| 19 | 0.157080 | 6.411697e-14 |
| 20 | 0.164934 | 1.037520e-14 |

FIG. 5

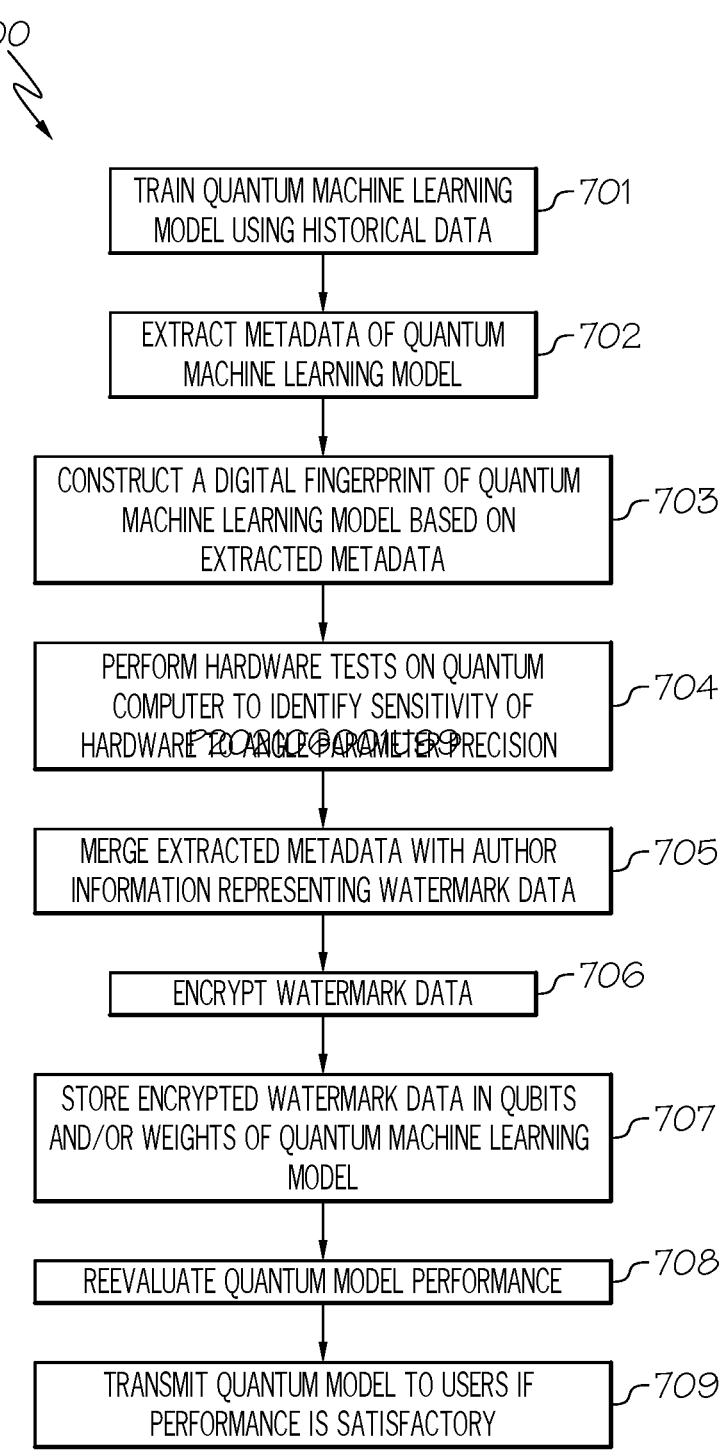

700

TRAIN QUANTUM MACHINE LEARNING MODEL USING HISTORICAL DATA —701

EXTRACT METADATA OF QUANTUM MACHINE LEARNING MODEL —702

CONSTRUCT A DIGITAL FINGERPRINT OF QUANTUM MACHINE LEARNING MODEL BASED ON EXTRACTED METADATA —703

PERFORM HARDWARE TESTS ON QUANTUM COMPUTER TO IDENTIFY SENSITIVITY OF HARDWARE TO ANGLE PARAMETER PRECISION —704

MERGE EXTRACTED METADATA WITH AUTHOR INFORMATION REPRESENTING WATERMARK DATA —705

ENCRYPT WATERMARK DATA —706

STORE ENCRYPTED WATERMARK DATA IN QUBITS AND/OR WEIGHTS OF QUANTUM MACHINE LEARNING MODEL —707

REEVALUATE QUANTUM MODEL PERFORMANCE —708

TRANSMIT QUANTUM MODEL TO USERS IF PERFORMANCE IS SATISFACTORY —709

READ DIGITS FROM WEIGHTS FROM KNOWN POSITIONS THAT FORM CYPHERTEXT ~ *801*

DECODE CYPHERTEXT ~ *802*

DECODE ENCRYPTED TEXT WITH SECRET KEY THEREBY RECONSTRUCTING WATERMARK DATA ~ *803*

EVALUATE MODEL TO CONFIRM AGREEMENT BETWEEN RECONSTRUCTED METADATA AND ORIGINAL METADATA ~ *804*

900

ASSESS A LEVEL OF TRUST BETWEEN A
USER AND A MODEL DEVELOPER — 901

PERFORM ONE OR MORE SPECIFIC TESTS FOR PROTECTING
AGAINST TAMPERING OF THE QUANTUM MODEL BASED
ON THE ASSESSED LEVEL OF TRUST — 902

PROVIDE THE RESULTS OF THE PERFORMED
TEST(S) TO THE USER — 903

WATERMARKING QUANTUM MODELS BY LEVERAGING METADATA

TECHNICAL FIELD

The present disclosure relates generally to watermarking machine learning models, and more particularly to watermarking quantum models by leveraging metadata.

BACKGROUND

Machine learning is the study of computer algorithms that can improve automatically through experience and by the use of data. Machine learning algorithms build a model based on sample data, known as training data, in order to make predictions or decisions without being explicitly programmed to do so. The performance of the machine learning models largely depends on the quality and quantity of their training data. However, the process of training the data collection, cleansing, processing, organizing, storing, and in certain cases even manual labeling is time-consuming and expensive. As a consequence, a trained machine learning model may be of high value and is to be considered the intellectual property of the legitimate owner, i.e., the party who created it.

Because of the high value of such trained machine learning models, individuals may want to steal such trained machine learning models so as to utilize the models without compensating the legitimate owner. As a result, it is important to protect the owner's intellectual property.

One attempt to protect the owner's intellectual property concerning the trained machine learning model is to label the model so that it can be traced back to the legitimate owner. The idea of marking digital property is called "watermarking." Watermarking, as used herein, refers to embedding identification information into the original data without affecting the data usage.

Currently, a method for watermarking machine learning models involves training the machine learning model based on the original data and a separate watermarking trigger dataset. The watermark may then be verified by querying the trigger set and verifying the labels with respect to the trigger set labels.

However, such machine learning models were developed using classical computers as opposed to quantum computers. As a result, the current approaches for watermarking machine learning models are not able to watermark quantum machine learning models in a robust and secure manner due to the differences in how quantum computers process information in comparison to classical computers. That is, such current approaches for watermarking machine learning models are not able to watermark quantum models developed with a quantum computer.

SUMMARY

In one embodiment of the present disclosure, a computer-implemented method for watermarking quantum models comprises determining a precision for a parameter of a quantum model on a quantum computer. The method further comprises truncating the parameter based on the determined precision. The method additionally comprises appending a watermark in one or more positions of truncated portion of the truncated parameter.

In this manner, the quantum models developed with a quantum computer can be watermarked.

In another embodiment of the present disclosure, a computer program product for watermarking quantum models, where the computer program product comprises one or more computer readable storage mediums having program code embodied therewith, where the program code comprises programming instructions for determining a precision for a parameter of a quantum model on a quantum computer. The program code further comprises the programming instructions for truncating the parameter based on the determined precision. The program code additionally comprises the programming instructions for appending a watermark in one or more positions of truncated portion of the truncated parameter.

In this manner, the quantum models developed with a quantum computer can be watermarked.

In a further embodiment of the present disclosure, a system comprises a memory for storing a computer program for watermarking quantum models and a processor connected to the memory. The processor is configured to execute program instructions of the computer program comprising determining a precision for a parameter of a quantum model on a quantum computer. The processor is further configured to execute the program instructions of the computer program comprising truncating the parameter based on the determined precision. The processor is additionally configured to execute the program instructions of the computer program comprising appending a watermark in one or more positions of truncated portion of the truncated parameter.

In this manner, the quantum models developed with a quantum computer can be watermarked.

In one embodiment of the present disclosure, a computer-implemented method for preventing negative effects of any tampering of a quantum model comprises assessing a level of trust between a user and a model developer who developed the quantum model to be used by the user. The method further comprises performing one or more specific tests for protecting against tampering of the quantum model based on the assessed level of trust between the user and the model developer. The method additionally comprises providing a result of the performed one or more specific tests to the user.

In this manner, tampering of a quantum model may be discovered whose negative effects may then be prevented.

In another embodiment of the present disclosure, a computer program product for preventing negative effects of any tampering of a quantum model, where the computer program product comprises one or more computer readable storage mediums having program code embodied therewith, where the program code comprises programming instructions for assessing a level of trust between a user and a model developer who developed the quantum model to be used by the user. The program code further comprises the programming instructions for performing one or more specific tests for protecting against tampering of the quantum model based on the assessed level of trust between the user and the model developer. The program code additionally comprises providing a result of the performed one or more specific tests to the user.

In this manner, tampering of a quantum model may be discovered whose negative effects may then be prevented.

In a further embodiment of the present disclosure, a system comprises a memory for storing a computer program for preventing negative effects of any tampering of a quantum model. The processor is configured to execute program instructions of the computer program comprising assessing a level of trust between a user and a model developer who developed the quantum model to be used by the user. The processor is further configured to execute the program instructions of the computer program comprising performing one or more specific tests for protecting against tampering of the quantum model based on the assessed level of trust between the user and the model developer. The processor is additionally configured to execute the program instructions of the computer program comprising providing a result of the performed one or more specific tests to the user.

In this manner, tampering of a quantum model may be discovered whose negative effects may then be prevented.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which:

FIG. 5 illustrates an exemplary table of the results comparing the ground states and the calculated p-values (null hypothesis) using the Fischer exact test in accordance with an embodiment present invention;

FIG. 7 is a flowchart of a method for watermarking quantum machine learning models developed with a quantum computer by leveraging metadata in accordance with an embodiment of the present disclosure;

DETAILED DESCRIPTION

Figure 1:
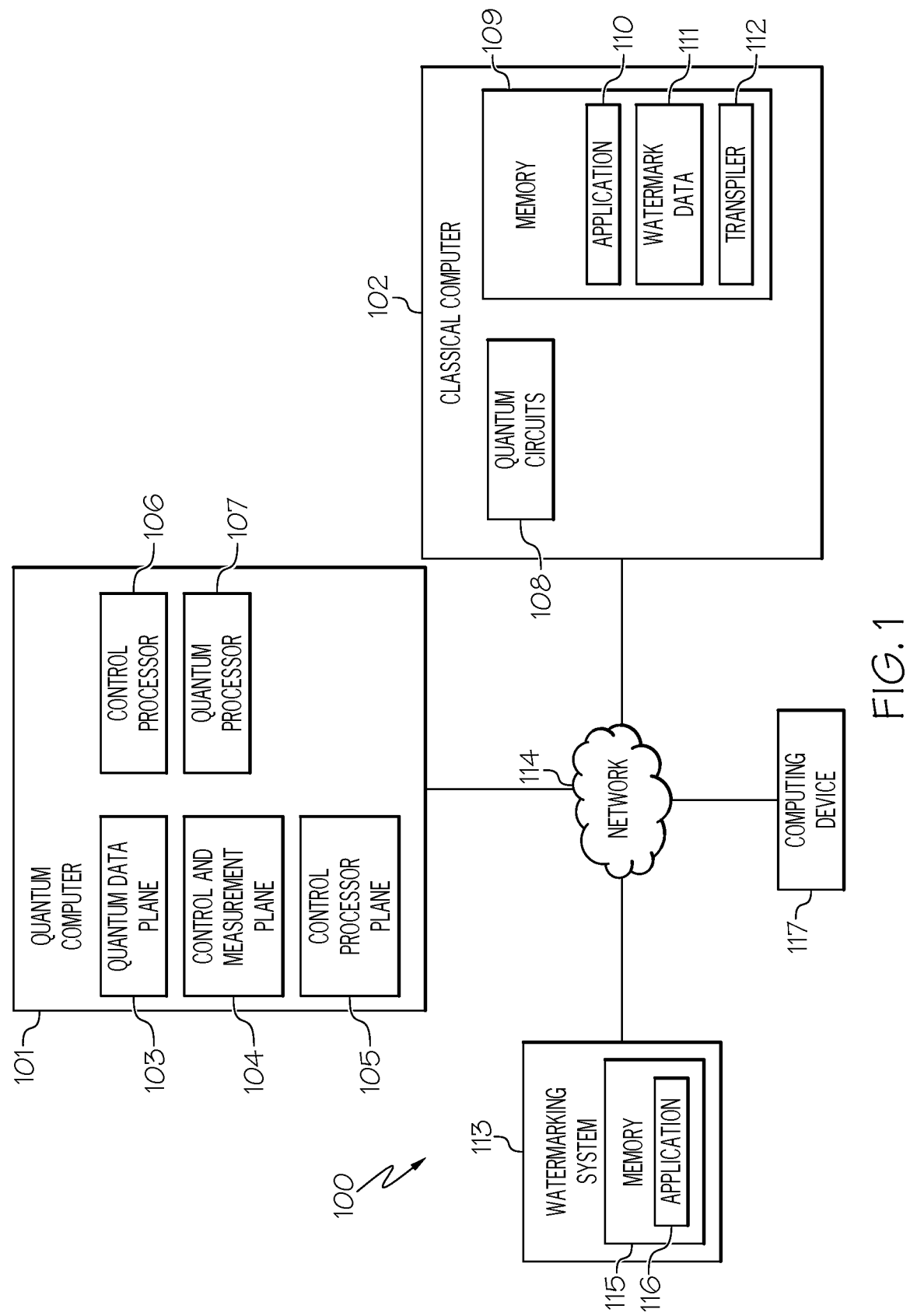
FIG. 1 illustrates a communication system for practicing the principles of the present disclosure in accordance with an embodiment of the present disclosure.

As stated in the Background section, currently, a method for watermarking machine learning models involves training the machine learning model based on the original data and a separate watermarking trigger dataset. The watermark may then be verified by querying the trigger set and verifying the labels with respect to the trigger set labels.

However, such machine learning models were developed using classical computers as opposed to quantum computers. As a result, the current approaches for watermarking machine learning models are not able to watermark quantum machine learning models in a robust and secure manner due to the differences in how quantum computers process information in comparison to classical computers. That is, such current approaches for watermarking machine learning models are not able to watermark quantum models developed with a quantum computer.

The embodiments of the present disclosure provide a means for watermarking quantum machine learning models developed with a quantum computer by leveraging metadata as discussed herein.

In some embodiments of the present disclosure, the present disclosure comprises a computer-implemented method, system and computer program product for watermarking quantum models. In one embodiment of the present disclosure, metadata of the quantum model developed with a quantum computer is extracted. "Metadata," as used herein, refers to data that provides information about other data. Examples of such extracted metadata include, but not limited to, a degree of entanglement, quantum Fisher information, geometric differences, an expected impact of noise on the quantum model, a quantum circuit expressed in a quantum programming language, and classical model performance parameters on a fixed dataset. A digital fingerprint of the quantum model may then be constructed based on the extracted metadata. A "digital fingerprint," as used herein, maps the extracted metadata to a much shorter bit string. Author information (e.g., author(s) who trained the quantum model, company name, unique code) is then merged with the constructed digital fingerprint to form the watermark data. The watermark data is encrypted, such as by using AES with a secret key and Base64 encoding, and then stored in qubits and/or weights of the quantum model. Qubits, as used herein, refer to "quantum bits," which correspond to the basic unit of quantum information in which a qubit is a two-state (or two-level) quantum-mechanical system. "Weights," as used herein, refer to the digits in the angle parameters that may be used for the storage of the watermark data, such as the encrypted watermark data. In this manner, the principles of the present disclosure provide a means for watermarking quantum models, such as quantum machine learning models, by leveraging metadata.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill the relevant art.

Referring now to the Figures in detail, FIG. 1 illustrates an embodiment of the present disclosure of a communication system 100 for practicing the principles of the present disclosure. Communication system 100 includes a quantum computer 101 configured to perform quantum computations, such as the types of computations that harness the collective properties of quantum states, such as superposition, interference and entanglement, as well as a classical computer 102 in which information is stored in bits that are represented logically by either a 0 (off) or a 1 (on). Examples of classical computer 102 include, but not limited to, a portable computing unit, a Personal Digital Assistant (PDA), a laptop computer, a mobile device, a tablet personal computer, a smartphone, a mobile phone, a navigation device, a gaming unit, a desktop computer system, a workstation, and the like configured with the capability of connecting to network 114 (discussed below).

In one embodiment, the quantum hardware of quantum computer 101 includes a quantum data plane 103, a control and measurement plane 104, a control processor plane 105, a control processor 106, and a quantum processor 107.

Quantum data plane 103 includes the physical qubits or quantum bits (basic unit of quantum information in which a qubit is a two-state (or two-level) quantum-mechanical system) and the structures needed to hold them in place. In one embodiment, quantum data plane 103 contains any support circuitry needed to measure the qubits' state and perform gate operations on the physical qubits for a gate-based system or control the Hamiltonian for an analog computer. In one embodiment, control signals routed to the selected qubit(s) set a state of the Hamiltonian. For gate-based systems, since some qubit operations require two qubits, quantum data plane 103 provides a programmable "wiring" network that enables two or more qubits to interact.

Control and measurement plane 104 converts the digital signals of control processor 106, which indicates what quantum operations are to be performed, to the analog control signals needed to perform the operations on the qubits in quantum data plane 103. In one embodiment, control and measurement plane 104 converts the analog output of the measurements of qubits in quantum data plane 103 to classical binary data that control processor 106 can handle.

Control processor plane 105 identifies and triggers the sequence of quantum gate operations and measurements (which are subsequently carried out by control and measurement plane 104 on quantum data plane 103). These sequences execute the program, provided by quantum processor 107, for implementing a quantum algorithm.

In one embodiment, control processor plane 105 runs the quantum error correction algorithm (if quantum computer 101 is error corrected).

Quantum processor 107 uses qubits to perform computational tasks. In the particular realms where quantum mechanics operate, particles of matter can exist in multiple states, such as an "on" state, an "off" state and both "on" and "off" states simultaneously. Quantum processor 107 harnesses these quantum states of matter to output signals that are usable in data computing.

In one embodiment, quantum processor 107 performs algorithms which conventional processors are incapable of performing efficiently. In one embodiment, quantum processor 107 includes its own data, boot files, operating system images and applications. Alternatively, as discussed further below, memory 109 may provide data, such as boot files, operating system images and applications, to quantum processor 107.

Referring again to FIG. 1, classical computer 102 includes one or more quantum circuits 108. Quantum circuits 108 may collectively or individually be referred to as quantum circuits 108 or quantum circuit 108, respectively. A "quantum circuit 108," as used herein, refers to a model for quantum computation in which a computation is a sequence of quantum logic gates, measurements, initializations of qubits to known values and possibly other actions. A "quantum logic gate," as used herein, is a reversible unitary transformation on at least one qubit. Quantum logic gates, in contrast to classical logic gate, are reversible. Examples of quantum logic gates include RX (performs $e^{i\theta X}$, which corresponds to a rotation of the qubit state around the X-axis by the given angle theta $\theta$ on the Bloch sphere), RY (performs $e^{i\theta Y}$, which corresponds to a rotation of the qubit state around the Y-axis by the given angle theta $\theta$ on the Bloch sphere), RXX (performs the operation $e^{(-i\theta/2 X \oplus X)}$ on the input qubit), RZZ (takes in one input, an angle theta $\theta$ expressed in radians, and it acts on two qubits), etc. In one embodiment, circuits 108 are written such that the horizontal axis is time, starting at the left hand side and ending at the right hand side.

Furthermore, in one embodiment, quantum circuit 108 corresponds to a command structure provided to control processor plane 105 on how to operate control and measurement plane 104 to run the algorithm on quantum data plane 103/quantum processor 107.

Furthermore, classical computer 102 includes memory 109 which may provide data, such as boot files, operating system images, and applications (e.g., applications 110) to quantum processor 107. In one embodiment, memory 109 includes an application 110 that may be configured to implement one or more of the methods described herein in accordance with one or more embodiments. For example, application 110 may implement a program for watermarking quantum models and a program for evaluating the encrypted watermark data as discussed further below in connection with FIGS. 7-8. In another example, application 110 may implement a program for preventing the negative effects of any tampering of a quantum model (e.g., quantum machine learning model) as discussed further below in connection with FIGS. 9-10. Additionally, in one embodiment, memory 109 stores watermark data 111, which corresponds to a digital fingerprint of the quantum machine learning model merged with author information as discussed further below. Examples of memory 109 include light quantum memory, solid quantum memory, gradient echo memory, electromagnetically induced transparency, etc.

Furthermore, in one embodiment, memory 109 stores a "transpiler 112," which as used herein, is configured to rewrite an abstract quantum circuit 108 into a functionally equivalent one that matches the constraints and characteristics of a specific target quantum device. In one embodiment, transpiler 112 (e.g., qiskit.transpiler, where Qiskit is an open-source software development kit for working with quantum computers at the level of circuits, pulses and algorithms) converts the trained machine learning model upon execution on quantum computer 101 to its elementary instructions and maps it to physical qubits. In one embodiment, the transpiled version of quantum circuit 108 acts as commands that control processor plane 105 would implement.

In one embodiment, quantum machine learning models are based on variational quantum circuits 108. Such models consist of data encoding, processing parameterized with trainable parameters and measurement/post-processing.

In one embodiment, the number of qubits (basic unit of quantum information in which a qubit is a two-state (or two-level) quantum-mechanical system) is determined by the number of features in the data. The processing stage may include multiple layers of parameterized gates. As a result, in one embodiment, the number of trainable parameters is (number of features)*(number of layers).

In one embodiment, the trainable parameters ($\theta$) are encoded as rotations using quantum logic gates (e.g., RX.

RY, RXX, RZZ, etc.). It is noted that physical device implementation of such quantum logic gates with electrical circuits and pulses only have limited precision and sensitivity. Thus, most of the numbers in the value of the parameter (e.g., a parameter with 12 digits) cannot be utilized as they exceed the precision attainable by the hardware (e.g., precision attainable is limited to 2-3 digits after the most significant digit).

In one embodiment, the trained quantum machine learning model can be represented by a logical circuit and a vector of parameters. Upon execution on quantum computer 101, transpiler 112 converts it to elementary instructions and maps it to physical qubits.

The mismatch between the classical representation of the parameters θ in memory 109 and the actual precision of quantum computer 101 allows one to repurpose the θ memory space to store auxiliary information. In one embodiment, such capacity may be used to store watermark data 111 in memory 109, controlling how the qubits are processed.

Furthermore, in one embodiment, a watermarking system 113 connected to quantum computer 101, classical computer 102 via a network 114 is configured to watermark quantum models as discussed below.

In one embodiment, watermarking system 113 is configured to watermark quantum machine learning models by leveraging metadata. "Metadata," as used herein, refers to classical and/or quantum metadata. In one embodiment, metadata, such as quantum metadata, may be extracted from the quantum machine learning model, such as the degree of entanglement, quantum Fisher information, geometric differences, an expected impact of noise on the quantum machine learning model, a quantum circuit (e.g., quantum circuit 108) expressed in a quantum programming language, and classical model performance parameters on a fixed dataset. Such metadata may be used to construct a digital fingerprint (mapping such data items to a much shorter bit string). In one embodiment, the digital fingerprint is merged with the constructed digital fingerprint to form watermark data 111, which is later encrypted and stored in qubits and/or weights of the quantum machine learning model. A more detailed description of these and other features is provided below.

In one embodiment, watermarking system 113 is configured to prevent negative effects of any tampering of a quantum model, such as a quantum machine learning model. In one embodiment, such negative effects may be prevented by discovering the tampering of the quantum model (e.g., quantum machine learning model) based on performing specific tests on the quantum model. In one embodiment, the specific tests to be performed on the quantum model (e.g., quantum machine learning model) are based on the level of trust between the user (e.g., user of computing device 117 discussed below) and the model developer, who developed the quantum model in question. A more detailed description of these and other features is provided below.

Watermarking system 113 may further include a memory 115 (e.g., random access memory) that stores an application 116, which may also be configured to implement one or more of the methods described herein in accordance with one or more embodiments. For example, in one embodiment, application 116 may implement a program for watermarking quantum models and a program for evaluating the encrypted watermark data as discussed further below in connection with FIGS. 7-8. In another example, application 116 may implement a program for preventing the negative effects of any tampering of a quantum model (e.g., quantum machine learning model) as discussed further below in connection with FIGS. 9-10.

A description of the software components of watermarking system 113 used for watermarking quantum machine learning models by leveraging metadata or for preventing the negative effects of any tampering of a quantum machine learning model is provided below in connection with FIG. 2. A description of the hardware configuration of watermarking system 113 is provided further below in connection with FIG. 6.

Network 114 may be, for example, a quantum network, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, a cellular network and various combinations thereof, etc. Other networks, whose descriptions are omitted here for brevity, may also be used in conjunction with system 100 of FIG. 1 without departing from the scope of the present disclosure.

Furthermore, system 100 includes a computing device 117 connected to watermarking system 113 via network 114. In one embodiment, the user of computing device 117 utilizes the quantum machine learning model developed with quantum computer 101. Examples of computing device 117 include, but not limited to, a portable computing unit, a Personal Digital Assistant (PDA), a laptop computer, a mobile device, a tablet personal computer, a smartphone, a mobile phone, a navigation device, a gaming unit, a desktop computer system, a workstation, an Internet appliance and the like configured with the capability of connecting to network 114. It is noted that both computing device 117 and the user of computing device 117 may be identified with element number 117.

System 100 is not to be limited in scope to any one particular network architecture. System 100 may include any number of quantum computers 101, classical computers 102, watermarking systems 113 and networks 114.

Figure 2:
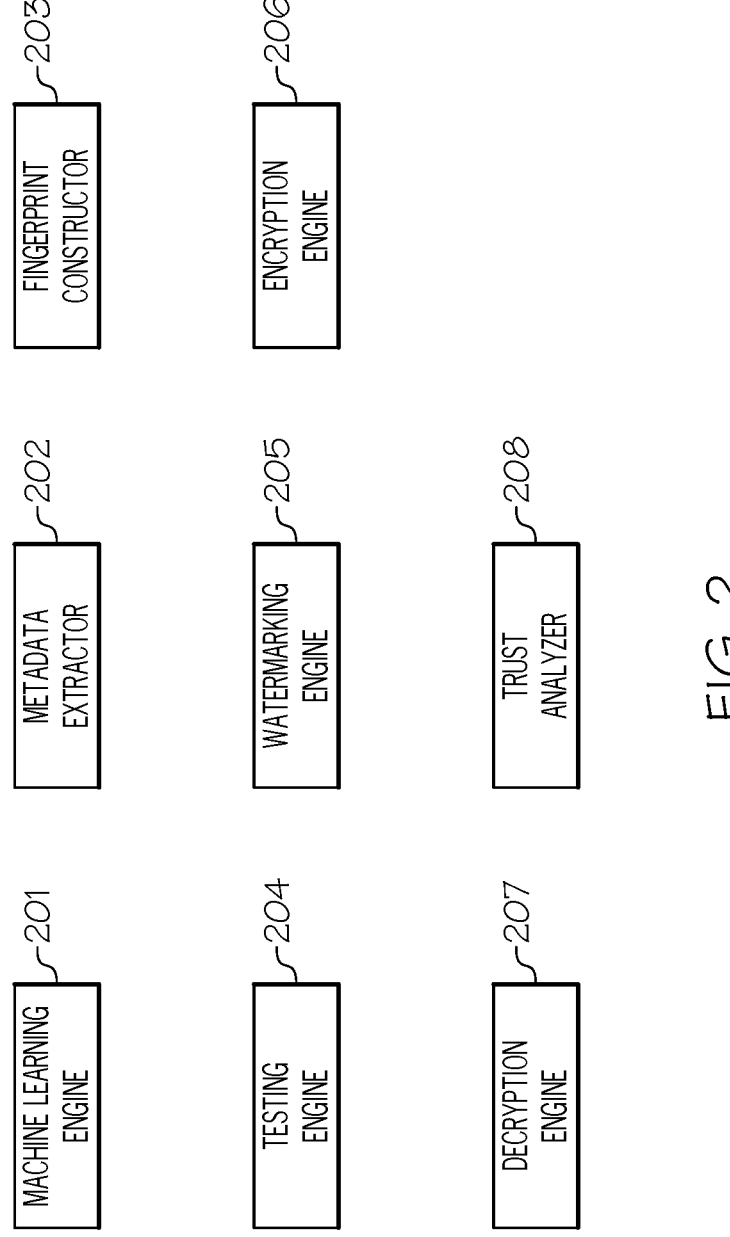
FIG. 2 is a diagram of the software components used by the watermarking system for watermarking quantum machine learning models by leveraging metadata or for preventing the negative effects of any tampering of a quantum machine learning model in accordance with an embodiment of the present disclosure.

As stated above, FIG. 2 is a diagram of the software components used by watermarking system 113 (FIG. 1) for watermarking quantum machine learning models by leveraging metadata or for preventing the negative effects of any tampering of a quantum machine learning model in accordance with an embodiment of the present disclosure.

Referring to FIG. 2, in conjunction with FIG. 1, watermarking system 113 includes a machine learning engine 201 configured to train a quantum machine learning model developed with quantum computer 101 using historical data.

In one embodiment, the quantum machine learning model corresponds to a parametrized quantum circuit.

In one embodiment, machine learning engine 201 uses a machine learning algorithm (e.g., supervised learning) to train the quantum machine learning model to make a prediction with expectation values based on sample data (data set).

Such a data set is referred to herein as the "training data," which is used to train the quantum machine learning model to make predictions or decisions. The algorithm iteratively makes predictions on the training data until the predictions achieve the desired accuracy. Such a desired accuracy is determined by a developer of the quantum machine learning algorithm. Examples of such supervised learning algorithms include nearest neighbor, Naïve Bayes, decision trees, linear regression, support vector machines and neural networks.

In one embodiment, the training data is inputted into a quantum circuit (quantum machine learning model) which optimizes the parameters, such as the rotation angle ($\theta$).

In one embodiment, the training data corresponds to historical data. In one embodiment, such historical data is classical data which needs to be encoded prior to being inputted into the quantum circuit (e.g., quantum circuit 108).

In one embodiment, the output results of the quantum circuit (e.g., quantum circuit 108) are then measured, such as in the form of expectation values, which is interpreted as the model prediction.

In one embodiment, the training of the quantum machine learning model includes the selection of the features in the original data set, the selection of the data encoding circuit, the selection of the processing circuit and the optimization of the $\theta$ training parameters for the given processing circuit using gradient or classical optimization algorithms (e.g., simultaneous perturbation stochastic approximation (SPSA), constrained optimization by linear approximation (COBYLA), etc.).

In one embodiment, the machine learning algorithms utilized by machine learning engine 201 correspond to quantum algorithms, such as algorithms that associate the amplitudes of a quantum state with the inputs and outputs of computations, algorithms that use amplitude amplification methods based on Grover's search algorithm, quantum-enhanced reinforcement learning, quantum annealing, a quantum neural network, a Hidden Quantum Markov Model, etc.

Watermarking system 113 further includes a metadata extractor 202 configured to extract metadata of the quantum machine learning model. "Metadata," as used herein, refers to data that provides information about other data. Examples of such extracted metadata include, but not limited to, a degree of entanglement, quantum Fisher information, geometric differences, an expected impact of noise on the quantum machine learning model, a quantum circuit (e.g., quantum circuit 108) expressed in a quantum programming language, and classical model performance parameters on a fixed dataset.

The "degree of entanglement," as used herein, refers to the physical phenomenon that occurs when a group of particles are generated, interact or share spatial proximity in a way such that the quantum state of each particle of the group cannot be described independently of the state of the others, including when the particles are separated by a large distance.

"Quantum Fisher information," as used herein, refers to the central quantity in quantum metrology and is the quantum analogue of the classical Fisher information.

"Geometric differences," as used herein, refers to a metric from quantum information theory. Specifically, geometric difference is the difference between similarity measures in difference machine learning models. "Quantum geometry," as used herein, refers to the set of mathematical concepts generalizing the concepts of geometry whose understanding is necessary to describe the physical phenomena at distance scales comparable to the Planck length, such as quantum gravity.

The "expected impact of noise on the quantum machine learning model," as used herein, refers to the impact on the performance of the quantum machine learning model in making predictions due to quantum noise. "Quantum noise," as used herein, refers to the random fluctuations of a signal due to the discrete character of electrons. In one embodiment, the expected impact of the quantum noise on the quantum machine learning model is determined based on the model of quantum noise. In one embodiment, such quantum noise models may be built using the Qiskit Aer noise module.

The "quantum circuit (e.g., quantum circuit 108) expressed in a quantum programming language," as used herein, refers to the particular quantum programing language used for expressing a designated quantum circuit 108, such as a quantum circuit 108 with a particular sequence of specific quantum logic gates. A "quantum programming language," as used herein, refers to expressing quantum algorithms using high-level constructs. Examples of such quantum programming languages include, but not limited to, quantum computing language (QCL), quantum macro assembler (QMASM), Silq®, QML®, Quantum Lambda Calculus, QFC, etc.

"Classical model performance parameters on a fixed dataset," as used herein, refers to those performance parameters (e.g., classification of images) that would be optimized using a classical machine learning model.

Such metadata information may be extracted from the quantum machine learning model by metadata extractor 202 using various software tools, such as, but not limited to, Artificial Intelligence Model Metadata Extractor (AIMMX), AWS® Media Analysis Solution, etc.

Furthermore, watermarking system 113 includes a fingerprint constructor 203 configured to construct a digital fingerprint of the quantum machine learning model based on the extracted metadata from metadata extractor 202. A "digital fingerprint," as used herein, maps the extracted metadata to a much shorter bit string.

In one embodiment, fingerprint constructor 203 uses a variety of content from the metadata extracted by metadata extractor 202, such as the degree of entanglement, the quantum Fisher information, the geometric differences, the expected impact of noise on the quantum machine learning model, the quantum circuit (e.g., quantum circuit 108) expressed in a quantum programming language, and classical model performance parameters on a fixed dataset. In one embodiment, fingerprint constructor 203 uses various software tools for selecting such metadata content to be used to generate a digital fingerprint, such as, but not limited to, Elsevier® Fingerprint Engine.

In one embodiment, fingerprint constructor 203 uses a hash algorithm (e.g., MD5) for generating a hash value based on the metadata extracted by metadata extractor 202. Such a hash value may correspond to the digital fingerprint.

In one embodiment, fingerprint constructor 203 uses a physical unclonable function (PUF) (e.g., static random access memory (SRAM) PUF, butterfly PUF) to generate a digital fingerprint based on the metadata extracted by metadata extractor 202.

Watermarking system 113 further includes a testing engine 204 configured to perform tests on the hardware (e.g., quantum data plane 103, control and measurement plane 104, control processor plane 105, control processor 106, quantum processor 107) of quantum computer 101 (used to develop the quantum machine learning model) to identify the sensitivity of the hardware to angle parameter precision. Examples of such tests include, but not limited to, performing N times $2\pi/N$ rotations, measuring fidelity with a ground state, performing forward and backward rotations and performing a combination of rotations along different axes.

"Performing N times $2\pi/N$ rotations," as used herein, refers to performing N times $2\pi/N$ quantum mechanical rotations, where N is a positive integer number.

"Measuring fidelity with a ground state," as used herein, refers to measuring quantum fidelity, which is a measure to quantify the closeness of two quantum states, with respect to a ground state.

"Performing forward and backward rotations," as used herein, refers to performing forward and background qubit rotations.

"Performing a combination of rotations along different axes," as used herein, refers to performing forward and/or backward qubit rotations along various rotation axes (e.g., Z axis).

Such tests may be performed by testing engine 204 so as to identify the change (δ) in the rotation angle (θ) such that the quantum hardware (e.g., quantum data plane 103, control and measurement plane 104, control processor plane 105, control processor 106, quantum processor 107) cannot guarantee an angle parameter precision at the rotation (θ+δθ). For example, if the quantum hardware (e.g., quantum data plane 103, control and measurement plane 104, control processor plane 105, control processor 106, quantum processor 107) can guarantee precision of only 2 digits after the most significant digit, then the rest of the positions of the angle parameter can be used for watermark storage.

Figures 3, 4:
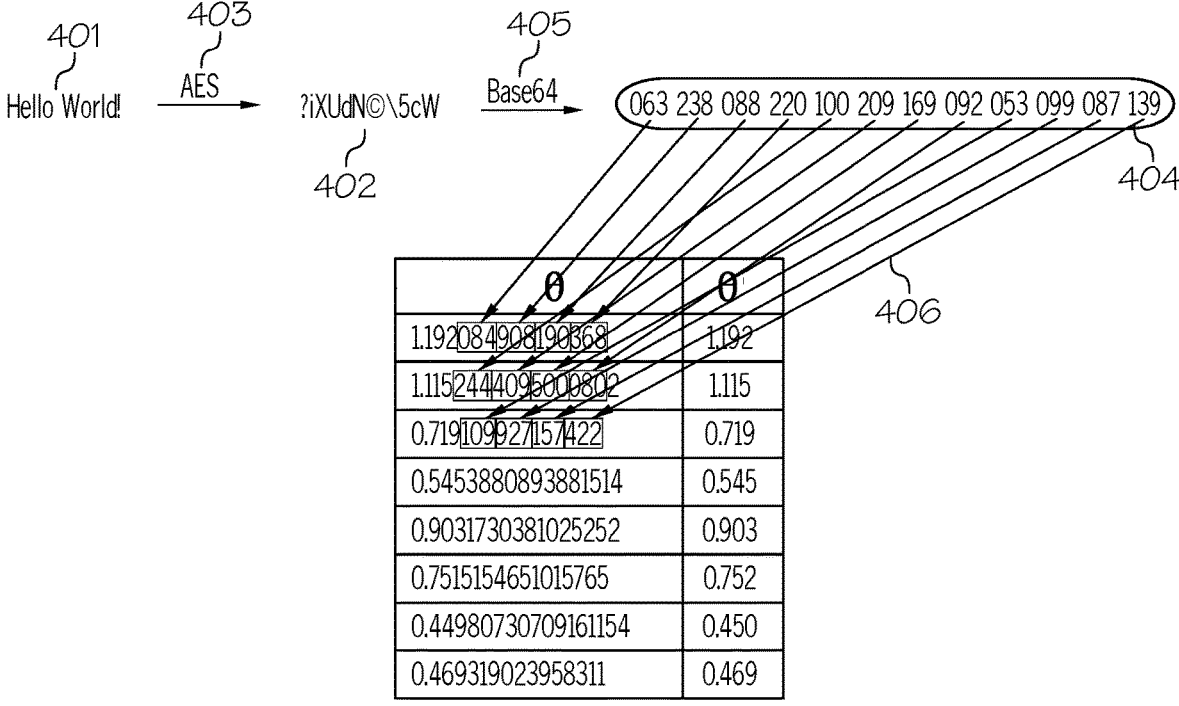
FIG. 3 illustrates a column of rotation angles (θ) and a column showing the guarantee precision of such a rotation angle (identified by θ') by the quantum hardware in accordance with an embodiment of the present invention.
FIG. 4 is an illustration of encrypting watermark data in accordance with an embodiment of the present invention.

For example, FIG. 3 illustrates a column 301 of rotation angles (θ) and a column 302 showing the guarantee precision of such a rotation angle (identified by θ') by the quantum hardware (e.g., quantum data plane 103, control and measurement plane 104, control processor plane 105, control processor 106, quantum processor 107) in accordance with an embodiment of the present invention.

Referring to FIG. 3, in such an example, the quantum hardware (e.g., quantum data plane 103, control and measurement plane 104, control processor plane 105, control processor 106, quantum processor 107) guarantees precision of the angle parameter to three digits after the most significant digit. As a result, about 12 digits in the angle parameter may be used for the storage of the watermark data 111 as discussed below.

Returning to FIG. 2, testing engine 204 may utilize various software tools for performing such tests on the hardware (e.g., quantum data plane 103, control and measurement plane 104, control processor plane 105, control processor 106, quantum processor 107) of quantum computer 101, such as, but not limited to, IQS, QuEST, Qrack, QX Simulator, Quantum++, CHP, Eqcs, LanQ, Q++, etc.

Furthermore, in one embodiment, testing engine 204 may test the performance of the quantum machine learning model to ensure that it is performing satisfactorily after encrypting watermark data 111 (discussed further below), and if it performs satisfactorily, may transmit the quantum model, such as to a user of a computing device 117 connected to watermarking system 113, such as via network 114, to use such a model. In one embodiment, satisfactory performance corresponds to a correct prediction rate that exceeds a user-designated percentage.

Testing engine 204 may utilize various software tools for testing the performance of the quantum machine learning model, such as, but not limited to, WEKA®, PyCharm®, Spyder, Testim®, Appvance®, Test.ai®, Functionize, etc.

Watermarking system 113 may additionally include a watermarking engine 205 configured to merge author information (e.g., author(s) who trained the quantum machine learning model, company name, unique code) with the constructed digital fingerprint to form watermark data 111.

In one embodiment, such a merger of information is accomplished by watermarking engine 205 using various software tools, including, but not limited to, LiGRE's data merging tool, GIS merge tool, Hevo Data, etc.

Watermarking system 113 further includes an encryption engine 206 configured to encrypt watermark data 111. In one embodiment, encryption engine 206 encrypts watermark data 111 using Advanced Encryption Standard (AES) with a secret key and a binary-to-text encoding scheme (e.g., Base64). An illustration of encrypting watermark data 111 using such a method is shown in FIG. 4 in accordance with an embodiment of the present invention.

Referring to FIG. 4, if watermark data 111 included the phrase "Hello World!" 401, it would be encrypted as "?iXUdN©\5cW" 402 via AES 403 which would be encoded as a cyphertext, such as 063 238 088 220 100 209 169 092 053 099 087 139 (see element 404), using Base64 405.

Returning to FIG. 2, encryption engine 206 is further configured to store the encrypted watermark data 111 in qubits and/or weights of the quantum machine learning model. In one embodiment, the entirety of the encrypted watermark data 111 is stored in qubits. Qubits, as used herein, refer to "quantum bits," which correspond to the basic unit of quantum information in which a qubit is a two-state (or two-level) quantum-mechanical system. In one embodiment, the encrypted watermark data 111 is encoded directly into qubits using a data encoding algorithm (e.g., amplitude encoding, basis encoding, angled encoding, etc.). In addition to information encoding on qubits, a set of gates may be added to quantum circuit 108 to produce a unique distribution, which can be used as an additional measure of authenticity.

In one embodiment, such watermark qubits are entangled with regular model qubits (e.g., using watermark qubits as control) so to make them more difficult for a user to determine which qubits are auxiliary (i.e., carry watermark data 111) and which constitute the quantum model. In one embodiment, encryption engine 206 disguises which qubits are model qubits and which are watermark qubits during encryption via a transformation to the overall circuit (e.g., amplitude encoding, basis encoding, angled encoding, etc.).

In one embodiment, encryption engine 206 is further configured to store the entirety of the encrypted watermark data 111 in the weights of the quantum machine learning model. "Weights," as used herein, refer to the digits in the angle parameters that may be used for the storage of watermark data 111, such as the encrypted watermark data 111. For example, referring again to FIG. 4, the exemplary encoded watermark data 111 (see element 404) may be split and substituted into the weights as shown by the arrows 406.

Returning to FIG. 2, in one embodiment, encryption engine 206 may store a portion of the encrypted watermark data 111 in the weights of the quantum machine learning model and store the other portion of the encrypted watermark data 111 in qubits.

Furthermore, watermarking system 113 includes a decryption engine 207 configured to reconstruct watermark data 111 from the encrypted version of watermark data 111 to identify the author information (e.g., author(s) who trained the quantum machine learning model, company name, unique code). In this manner, the watermark on the quantum model can be obtained.

In the embodiment in which the encrypted watermark data 111 is entirely stored in the weights of the quantum machine learning model, decryption engine 207 reconstructs watermark data 111 by decrypting the encrypted watermark data 111, such as by decoding cyphertext 404 of FIG. 4. In one embodiment, cyphertext 404 is obtained by decryption engine 207 reading the digits from the weights from the known positions that store the encrypted watermark data 111. In one embodiment, such known positions are obtained via the same channel as the secret key. In one embodiment, decryption engine 207 decodes the cyphertext (e.g., cyphertext 404) by decoding the Base64 encoding that formed cyphertext 404 to form the encrypted text 402 of FIG. 4.

In one embodiment, following the decoding of cyphertext 404 which corresponds to the encrypted text 402, decryption engine 207 decodes the encrypted text 402 with the secret key thereby reconstructing watermark data 111.

In one embodiment, decryption engine 207 evaluates the quantum machine learning model to confirm agreement between the metadata of the reconstructed watermark data 111 with the original metadata of the quantum machine learning model obtained by metadata extractor 202. If there is agreement between such metadata, then it may be inferred that the decrypted watermark data 111 is correct and valid and that it contains the correct author information. That is, the provenance or record of ownership can be certified.

In the embodiment in which the encrypted watermark data 111 is entirely stored in the qubits, decryption engine 207 reconstructs watermark data 111 using the information as to which qubits store the encrypted watermark data 111 and which qubits constitute the model, where such information may be obtained via the same channel as the secret key. After identifying which qubits store the encrypted watermark data 111, such encrypted watermark data 111 may be decrypted in a similar manner as discussed above. In one embodiment, in order to extract the encrypted watermark data 111 from qubits, decryption engine 207 utilizes the pre-determined input to the model which may be obtained via the same channel as the secret key.

In the embodiment in which a portion of the encrypted watermark data 111 is stored in the weights of the quantum machine learning model and the other portion of the encrypted watermark data 111 is stored in qubits, the particular qubits which store a portion of the encrypted watermark data 111 as well as the particular digits/positions of the angle parameters that store the other portion of the encrypted watermark data 111 (i.e., which weights of the quantum machine learning model store the other portion of the encrypted watermark data 111) may be obtained via the same channel as the secret key. After identifying which qubits and which weights of the quantum machine learning model store the encrypted watermark data 111, such encrypted watermark data 111 may be decrypted in a similar manner as discussed above.

Watermarking system 113 further includes a trust analyzer 208 configured to determine a level of trust between a user (e.g., user of computing device 117) and the model developer (developer of the quantum machine learning model, including the developer's organization). In one embodiment, such a level of trust is provided to trust analyzer 208 directly by the user, such as by the user inputting such a level of trust on the user interface of computing device 117 via various input means which is transmitted to watermarking system 113 via network 114. In one embodiment, such a level of trust is based on various criteria, such as, but not limited to, whether the model developer organization is new, whether the model developer organization has supplied prior quantum models to the user, country of origin of the model developer organization, complexity of the quantum model in comparison to other quantum models, level of detail in model description/metadata, etc.

For example, if the model developer organization is new, then the level of trust between the user and the model developer is said to be a low level of trust. If, on the other hand, the model developer organization has been established for a long period of time (e.g., twenty years), then the level of trust between the user and the model developer may be said to be a high level of trust. In one embodiment, such information regarding the date of establishment of the model developer organization is obtained directly from the user, which may be inputted by the user to computing device 117 via various input means which is transmitted to watermarking system 113 via network 114.

In another example, if the model developer organization has supplied a user-designated number of prior quantum models to the user (e.g., user of computing device 117), then the level of trust between the user and the model developer may be said to be a high level of trust. If, on the other hand, the model developer organization has not previously supplied a quantum model to the user, or has supplied a relatively few number of quantum models to the user, then the level of trust between the user and the model developer may be said to be a low level of trust. In one embodiment, such information regarding the number of quantum models previously provided to the user by the model developer organization is obtained directly from the user, which may be inputted by the user to computing device 117 via various input means which is transmitted to watermarking system 113 via network 114.

In a further example, the country of origin of the model developer organization may affect the level of trust between the user and the model developer. For instance, if the country of origin of the model developer organization differs from the user (e.g., user of computing device 117), then the level of trust between the user and the model developer may be said to be a low level of trust. If, on the other hand, the country of origin of the model developer organization is the same as the user (e.g., user of computing device 117), then the level of trust between the user and the model developer may be said to be a high level of trust. In one embodiment, such information regarding the country of origin of the model developer organization as well as the country of origin of the user may be inputted by the user to computing device 117 via various input means which is transmitted to watermarking system 113 via network 114.

In another example, trust analyzer 208 determines the level of trust between the user (e.g., user of computing device 117) and the model developer based on the complexity of the quantum model in comparison to other quantum models. For instance, the less complex is the quantum model (e.g., quantum machine learning model) in question, the higher the level of trust between the user and the model developer and vice-versa. In one embodiment, trust analyzer 208 determines the complexity of the quantum machine learning model in question based on the complexity of the logical circuit and vector of parameters representing the trained quantum machine learning model, where the logical circuit and vector parameters may be provided to trust analyzer 208 by metadata extractor 202. The greater the complexity of the logical circuit and vector of parameters, the greater the complexity of the quantum model is said to be and vice-versa. In one embodiment, the complexity of the logical circuit may be based on the size or depth of the logical circuit, which may be determined using various software tools, such as logic analyzers (e.g., Logic Analyzer by Tektronix®). The greater the size or depth of the logical circuit, the greater the complexity of the quantum model and vice-versa. In one embodiment, the complexity of the vector of parameters may be based on the number of parameters, which may be determined using various software tools, such as Simulink® Design Optmization™, etc. The greater the number of parameters, the greater the complexity of the quantum model and vice-versa. In one embodiment, trust analyzer 208 determines the complexity of the quantum machine learning model in question based on the number of elementary instructions and physical qubits required to perform the algorithm generated by transpiler 112. The greater the number of elementary instructions and physical qubits, the greater the complexity of the quantum model is said to be and vice-versa.

In a further example, trust analyzer 208 determines the level of trust between the user (e.g., user of computing device 117) and the model developer based on the level of detail in the model description/metadata. In one embodiment, such a level of detail is based on the number of different types of metadata (e.g., degree of entanglement, quantum Fisher information, geometric differences, etc.) provided by metadata extractor 202 to trust analyzer 208 to be used to determine the level of trust between the user (e.g., user of computing device 117) and the model developer. The greater the level of detail in the model description/metadata, the greater the level of trust between the user and the model developer and vice-versa.

In one embodiment, based on the level of trust (e.g., high-trust, low-trust) between the user (e.g., user of computing device 117) and the model developer as determined by trust analyzer 208, one or more various tests may be performed by watermarking system 113 to discover tampering of the quantum model as well as to prevent the negative effects of any tampering of the quantum model. The particular tests to be performed by watermarking system 113 based on the trust environment (level of trust between the user and the model developer) is discussed further below. The results of such test(s) may then be provided to the user (e.g., user of computing device 117) by trust analyzer 208. For example, in one embodiment, such results may be provided to the user electronically, such as via an electronic message, sent to computing device 117 via network 114.

In one embodiment, one such test is to validate the model description and benchmarks of the quantum model, such as a quantum machine learning model. In one embodiment, testing engine 204 retrieves the model description and benchmarks from metadata extractor 202, where such benchmarks were obtained from prior usage of the quantum machine learning model. The "model description," as used herein, refers to the documentation describing the quantum model, such as prepared by the model developer organization. The "benchmarks," as used herein, refer to prior metrics, results, calculations, etc. attributed to a prior performance of the quantum machine learning model. In one embodiment, the model description and benchmarks are obtained from metadata extractor 202. An example of the model description is a description of the quantum model provided by the author. Examples of such benchmarks include predictions, metrics (e.g., area under the curve (AUC)), quantum and classical properties (e.g., level of entanglement, model capacity, etc.), etc.

In one embodiment, testing engine 204 validates the retrieved model description and benchmarks. In one embodiment, the model description is validated by determining if the documentation applies to the latest model update. For instance, the latest model update may be identified by a version number, and if such a version number is not identified in the documentation, then it may be inferred that the documentation was not updated during the latest model update. In one embodiment, testing engine 204 utilizes natural language processing to identify the model update or version number in the received documentation. In one embodiment, the latest version number of the quantum model may be obtained by testing engine 204 via the metadata extracted by metadata extractor 202, which may include the version number of the quantum machine learning model.

In one embodiment, the benchmarks are validated by running the quantum machine learning model by testing engine 204 and comparing the benchmarks obtained from running the quantum machine learning model with the retrieved benchmarks (obtained from metadata extractor 202).

In one embodiment, if there is a discrepancy with the model description (e.g., the model description was not updated during the latest model update) or the benchmarks (e.g., metrics obtained from running the quantum machine learning model differ from the metrics obtained from metadata extractor 202 from a prior usage of the quantum machine learning model), then the quantum machine learning model is said not to be validated. In such a case, the model developer is informed of non-validation, such as via electronic communication. For instance, a computing device (similar to computing device 117) of the model developer may be connected to watermarking system 113 via a network, such as network 114. As a result, an electronic notification may be sent to the computing device of the model developer by testing engine 204 of watermarking system 113 via a network, such as network 114. In this manner, tampering of the quantum model may be discovered and the negative effects of such tampering would be prevented.

Another test that may be performed based on the trust environment is to validate watermark data 111 by decryption engine 207. That is, decryption engine 207 may validate the reconstructed watermark data 111. As previously discussed, decryption engine 207 is configured to reconstruct watermark data 111 from the encrypted version of watermark data 111 to identify the author information (e.g., author(s) who trained the quantum machine learning model, company name, unique code).

In one embodiment, decryption engine 207 validates the reconstructed watermark data 111 by comparing such watermark data 111 against the watermark data 111 formed by watermarking engine 205. As previously discussed, watermarking engine 205 is configured to merge author information (e.g., author(s) who trained the quantum machine learning model, company name, unique code) with the constructed digital fingerprint to form watermark data 111.

In one embodiment, if there is a discrepancy between the reconstructed watermark data 111 with the watermark data 111 formed by watermarking engine 205, then the watermark data 111 may be said to not be validated. In such a case, the model developer is informed of non-validation, such as via electronic communication. For instance, a computing device (similar to computing device 117) of the model developer may be connected to watermarking system 113 via a network, such as network 114. As a result, an electronic notification may be sent to the computing device of the model developer by decryption engine 207 of watermarking system 113 via a network, such as network 114. In this manner, tampering of the quantum model may be discovered and the negative effects of such tampering would be prevented. If, however, there is agreement between the reconstructed watermark data 111 with the watermark data 111 formed by watermarking engine 205, then the watermark data 111 may be said to be validated.

In one embodiment, decryption engine 207 utilizes a software tool, such as Compare by Dispatch, Sisense®, Thoughtspot®, Qlik, Tableau®, IBM® Cognos®, etc. to identify any differences between the reconstructed watermark data 111 with the watermark data 111 formed by watermarking engine 205.

Another test that may be performed based on the trust environment is to validate the digital fingerprint by decryption engine 207.

As discussed above, watermark data 111 includes both the digital fingerprint and the author information (e.g., author(s) who trained the quantum machine learning model, company name, unique code). Upon decryption engine 207 reconstructing watermark data 111, the digital fingerprint of the reconstructed watermark data 111 may be compared against the digital fingerprint of the quantum machine learning model constructed by fingerprint constructor 203. As previously discussed, fingerprint constructor 203 is configured to construct a digital fingerprint of the quantum machine learning model based on the extracted metadata from metadata extractor 202. In one embodiment, decryption engine 207 utilizes a software tool, such as Compare by Dispatch, Sisense®, Thoughtspot®, Qlik, Tableau®, IBM® Cognos®, etc. to identify any differences between the digital fingerprint of the reconstructed watermark data 111 with the digital fingerprint constructed by fingerprint constructor 203.

If there is agreement between the digital fingerprint of the reconstructed watermark data 111 with the digital fingerprint constructed by fingerprint constructor 203, then the digital fingerprint may be said to be validated. If, however, there is no agreement between the digital fingerprint of the reconstructed watermark data 111 with the digital fingerprint constructed by fingerprint constructor 203, then the digital fingerprint may be said to not be validated. In such a case, the model developer is informed of non-validation, such as via electronic communication. For instance, a computing device (similar to computing device 117) of the model developer may be connected to watermarking system 113 via a network, such as network 114. As a result, an electronic notification may be sent to the computing device of the model developer by decryption engine 207 of watermarking system 113 via a network, such as network 114. In this manner, tampering of the quantum model may be discovered and the negative effects of such tampering would be prevented.

Another test that may be performed based on the trust environment is to update the quantum machine learning model by testing engine 204. In one embodiment, testing engine 204 updates the quantum machine learning model by rounding and truncating parameter values to match the accuracy of the respective hardware gates.

In one embodiment, testing engine 204 runs experiments on the quantum hardware (e.g., quantum data plane 103, control and measurement plane 104, control processor plane 105, control processor 106, quantum processor 107) to evaluate the accuracy. For example, in connection with the RY(θ) gate, testing engine 204 may run 3 rotations (2π/3) over the Y axis and introduce a small deviation (Δθ). For instance, if Δθ=0, then the ground state is measured. It is noted that in the presence of noise, the ground state measurement may not be possible all the time. Next, the deviation may be changed in a small region (e.g., [0, π/8]) and the result is measured. Testing engine 204 may utilize various software tools for running such experiments on the hardware (e.g., quantum data plane 103, control and measurement plane 104, control processor plane 105, control processor 106, quantum processor 107) of quantum computer 101, such as, but not limited to, IQS, QuEST, Qrack, QX Simulator, Quantum++, CHP, Eqcs, LanQ, Q++, etc.

In one embodiment, the results of such a calculation represent frequencies of |0> and |1> states attached to the value of Δθ. Next, testing engine 204 may construct tables (e.g., 2×2 tables) of the results comparing the ground states and the calculated p-values (null hypothesis) using the Fischer exact test (statistical significance test used in the analysis of contingency tables). In one embodiment, such calculations are run by testing engine 204 using IBM® Cognos®. An exemplary illustration of the results is shown in FIG. 5. FIG. 5 illustrates an exemplary table 500 (top 20 rows) of the results comparing the ground states and the calculated p-values (null hypothesis) using the Fischer exact test in accordance with an embodiment present invention.

Referring to FIG. 5, table 500 includes a column 501 of row numbers, a column 502 ("d_theta") for the values of Δθ, and a column 503 ("p_value") for the p-values. As shown in row 7, the p-value is constantly<0.05, which indicates statistical significance of the result difference from the ground state. As a result, it can be concluded that the RY(θ) gate is only sensitive to about 2 digits after the decimal point. Consequently, such parameter values may be rounded to 2 digits after the decimal point and the remaining digits in the parameter values may be truncated. By repeating such a process for all the parameters, the integrity of any embedded "malicious" data will be broken while leaving model performance on such noisy hardware intact. This is because such embedded "malicious" data may reside in those digits of the parameter values that were truncated. In this manner, tampering of the quantum model may be discovered and the negative effects of such tampering would be prevented.

In one embodiment, testing engine 204 retrains the quantum machine learning model to perform a limited number of additional training iterations using modified model coefficients. Testing engine 204 may utilize various software tools retraining the quantum machine learning model, such as, but not limited to, WEKA®, PyCharm®, Spyder, Testim®, Appvance®, Test.ai®, Functionize, etc.

In one embodiment, such modified model coefficients are modified in the digits of the angle parameters where precision is not guaranteed by the quantum hardware (e.g., quantum data plane 103, control and measurement plane 104, control processor plane 105, control processor 106, quantum processor 107). In one embodiment, in low-trust environments (i.e., where there is a low level of trust between the user and the model developer), the quantum machine learning model may be retrained to perform a limited number of additional training iterations. In one embodiment, the existing model coefficients are only slightly changed. In the scenario in which the "malicious" data is introduced into the quantum model by being split into chunks, even a small change in the parameter values can break the integrity of the embedded malware. For example, by retraining the quantum machine learning model, the θ parameter may change its value from 0.469319023958311 to 0.469404036749485. While such a change is less than 0.1% of its original value, the malware information embedded in the parameter would be lost. In this manner, tampering of the quantum model may be discovered and the negative effects of such tampering would be prevented.

As previously discussed, the number and types of tests to be performed by watermarking system 113 to discover tampering of the quantum model as well as to prevent the negative effects of any tampering of the quantum model is based on the level of trust between the user (e.g., user of computing device 117) and the model developer. For example, in a very low-trust environment, the quantum machine learning model may be both updated and retrained as discussed above. In one embodiment, the choice as to whether the updating and/or retraining of the quantum machine learning model is performed (determined by trust analyzer 208) depends on the availability of the training data and the training mechanism. If no training data is available, then only the updating of the quantum machine learning model may need to be performed. If, however, at least some training data is available, including artificially generated, then the quantum machine learning model may be retrained in addition to possibly updating the quantum machine learning model.

In higher-trust environments, the model description and even watermark information may be shared among the model developer and the user. In lower-trust environments, such information would not be shared among the model developer and the user.

In one embodiment, the different types of hardware utilized by the model developer and the user may be taken into consideration in detecting tampering of the quantum machine learning model, such as via the noise profiles of such hardware. The impact of the modification on the result will remain constant while the hardware noise may fluctuate. A protocol may be devised by which the data is transferred via qubits from the source and the results are transferred to the source. In one embodiment, state fidelity measurements are used as a measure of closeness. Measurements that are indicative of a lack of closeness may be indicative of tampering of the quantum machine learning model. This process may be repeated for several days with different qubit configurations and devices.

A further description of these and other functions is provided below in connection with the discussion of the method for watermarking quantum models and the method for evaluating the encrypted watermark data as well as the method for preventing negative effects of any tampering of a quantum model and the method for testing the quantum model to protect against tampering of the quantum model.

Prior to the discussion of the method for watermarking quantum models and the method for evaluating the encrypted watermark data as well as the method for preventing negative effects of any tampering of a quantum model and the method for testing the quantum model to protect against tampering of the quantum model, a description of the hardware configuration of watermarking system 113 is provided below in connection with FIG. 6.

Figure 6:
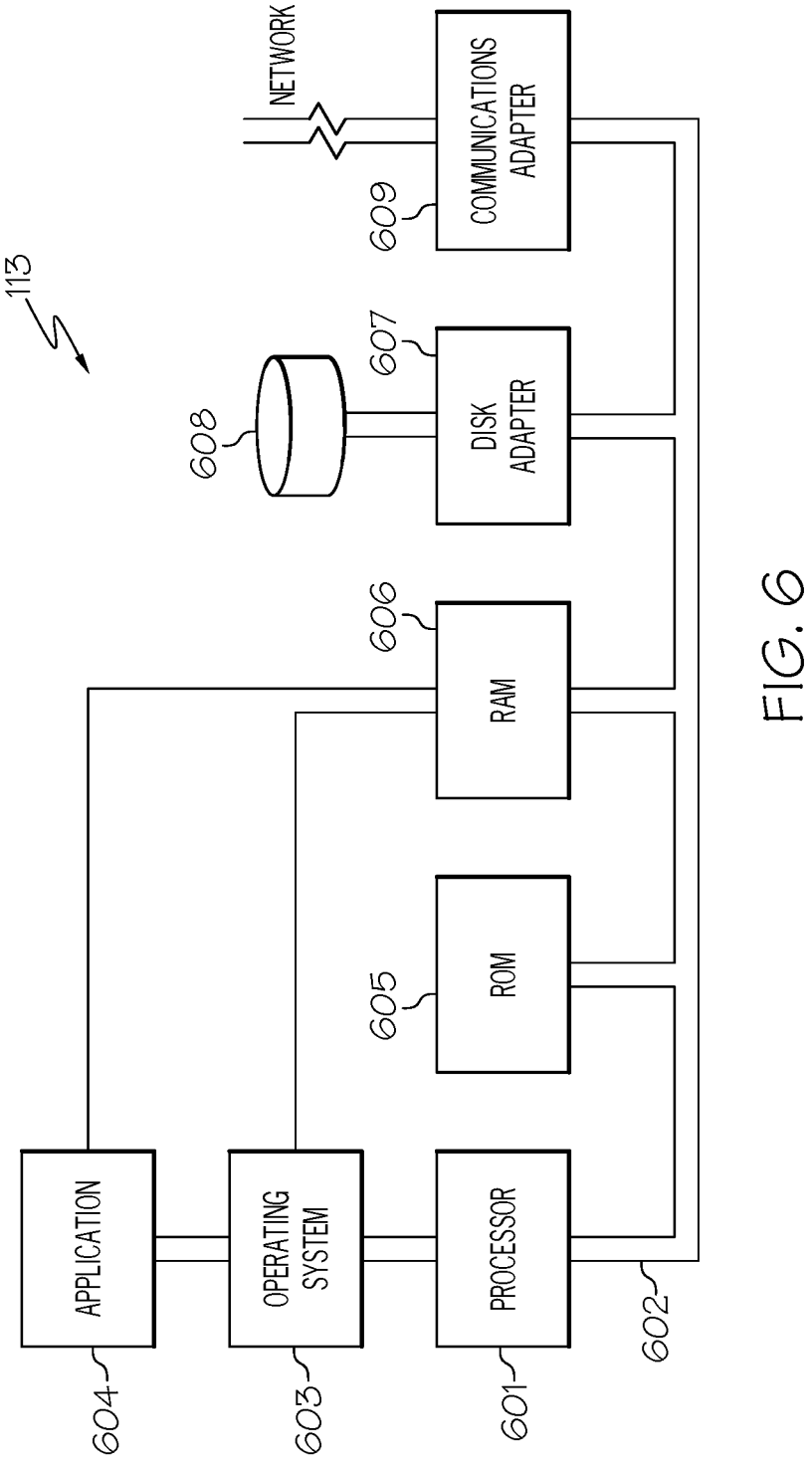
FIG. 6 illustrates an embodiment of the present disclosure of the hardware configuration of the watermarking system which is representative of a hardware environment for practicing the present disclosure.

Referring now to FIG. 6, FIG. 6 illustrates an embodiment of the present disclosure of the hardware configuration of watermarking system 113 (FIG. 1) which is representative of a hardware environment for practicing the present disclosure.

Watermarking system 113 has a processor 601 connected to various other components by system bus 602. An operating system 603 runs on processor 601 and provides control and coordinates the functions of the various components of FIG. 6. An application 604 in accordance with the principles of the present disclosure runs in conjunction with operating system 603 and provides calls to operating system 603 where the calls implement the various functions or services to be performed by application 604. In one embodiment, application 604 corresponds to application 116 of FIG. 1. Application 604 may include, for example, machine learning engine 201 (FIG. 2), metadata extractor 202 (FIG. 2), fingerprint constructor 203 (FIG. 2), testing engine 204 (FIG. 2), watermarking engine 205 (FIG. 2), encryption engine 206 (FIG. 2), decryption engine 207 (FIG. 2) and trust analyzer 208 (FIG. 2). Furthermore, application 604 may include, for example, a program for watermarking quantum models as discussed further below in connection with FIG. 7. In another example, application 604 may include a program for evaluating the encrypted watermark data as discussed further below in connection with FIG. 8. In a further example, application 604 may include a program for preventing the negative effects of any tampering of a quantum machine learning model as discussed further below in connection with FIGS. 9-10.

Referring again to FIG. 6, read-only memory ("ROM") 605 is connected to system bus 602 and includes a basic input/output system ("BIOS") that controls certain basic functions of watermarking system 113. Random access memory ("RAM") 606 and disk adapter 607 are also connected to system bus 602. In one embodiment, memory 605 and/or memory 606 corresponds to memory 115 of FIG. 1. It should be noted that software components including operating system 603 and application 604 may be loaded into RAM 606, which may be watermarking system's 113 main memory for execution. Disk adapter 607 may be an integrated drive electronics ("IDE") adapter that communicates with a disk unit 608, e.g., disk drive. It is noted that the program for watermarking quantum models, as discussed further below in connection with FIG. 7, or the program for evaluating the encrypted watermark data, as discussed further below in connection with FIG. 8, may reside in disk unit 608 or in application 604. It is further noted that the program for preventing the negative effects of any tampering of a quantum machine learning model, as discussed further below in connection with FIGS. 9-10, may reside in disk unit 608 or in application 604.

Watermarking system 113 may further include a communications adapter 609 connected to bus 602. Communications adapter 609 interconnects bus 602 with an outside network (e.g., network 114) to communicate with other devices, such as computing device 117, quantum computer 101, etc.

In one embodiment, application 604 includes the software components of machine learning engine 201, metadata extractor 202, fingerprint constructor 203, testing engine 204, watermarking engine 205, encryption engine 206, decryption engine 207 and trust analyzer 208. In one embodiment, such components may be implemented in hardware, where such hardware components would be connected to bus 602. The functions discussed above performed by such components are not generic computer functions. As a result, watermarking system 113 is a particular machine that is the result of implementing specific, non-generic computer functions.

In one embodiment, the functionality of such software components (e.g., machine learning engine 201, metadata extractor 202, fingerprint constructor 203, testing engine 204, watermarking engine 205, encryption engine 206, decryption engine 207 and trust engine 208) of watermarking system 113, including the functionality for watermarking quantum models and for evaluating the encrypted watermark data as well as the functionality for preventing the negative effects of any tampering of a quantum machine learning model, may be embodied in an application specific integrated circuit.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated above, currently, a method for watermarking machine learning models involves training the machine learning model based on the original data and a separate watermarking trigger dataset. The watermark may then be verified by querying the trigger set and verifying the labels with respect to the trigger set labels. However, such machine learning models were developed using classical computers as opposed to quantum computers. As a result, the current approaches for watermarking machine learning models are not able to watermark quantum machine learning models in a robust and secure manner due to the differences in how quantum computers process information in comparison to classical computers. That is, such current approaches for watermarking machine learning models are not able to watermark quantum models developed with a quantum computer.

Figure 8:
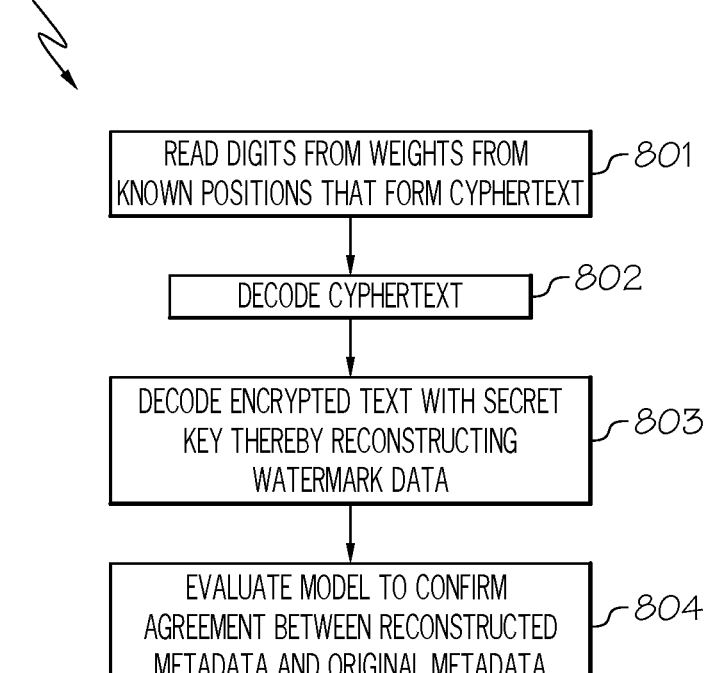
FIG. 8 is a flowchart of a method for evaluating the encrypted watermark data in accordance with an embodiment of the present invention.

The embodiments of the present disclosure provide a means for watermarking quantum machine learning models developed with a quantum computer by leveraging metadata as discussed below in connection with FIGS. 7-8. FIG. 7 is a flowchart of a method for watermarking quantum machine learning models developed with a quantum computer by leveraging metadata. FIG. 8 is a flowchart of a method for evaluating the encrypted watermark data.

As stated above, FIG. 7 is a flowchart of a method 700 for watermarking quantum machine learning models developed with a quantum computer by leveraging metadata in accordance with an embodiment of the present disclosure.

Referring to FIG. 7, in conjunction with FIGS. 1-6, in step 701, machine learning engine 201 of watermarking system 113 trains a quantum machine learning model developed with quantum computer 101 using historical data.

As discussed above, in one embodiment, the quantum machine learning model corresponds to a parametrized quantum circuit.

In one embodiment, machine learning engine 201 uses a machine learning algorithm (e.g., supervised learning) to train the quantum machine learning model to make a prediction with expectation values based on sample data (data set).

Such a data set is referred to herein as the "training data," which is used by the machine learning algorithm to train the quantum machine learning model to make predictions or decisions. The algorithm iteratively makes predictions on the training data until the predictions achieve the desired accuracy. Such a desired accuracy is determined by an expert. Examples of such supervised learning algorithms include nearest neighbor, Naïve Bayes, decision trees, linear regression, support vector machines and neural networks.

In one embodiment, the training data is inputted into a quantum circuit (quantum machine learning model) which optimizes the parameters, such as the rotation angle ($\theta$).

In one embodiment, the training data corresponds to historical data. In one embodiment, such historical data is classical data which needs to be encoded prior to be inputted into the quantum circuit.

In one embodiment, the output results of the quantum circuit are then measured, such as in the form of expectation values, which is interpreted as the model prediction.

In one embodiment, the training of the quantum machine learning model includes the selection of the features in the original data set, the selection of the data encoding circuit, the selection of the processing circuit and the optimization of the 0 training parameters for the given processing circuit using gradient or classical optimization algorithms (e.g., simultaneous perturbation stochastic approximation (SPSA), constrained optimization by linear approximation (COBYLA), etc.).

In one embodiment, the machine learning algorithms utilized by machine learning engine 201 correspond to quantum algorithms, such as algorithms that associate the amplitudes of a quantum state with the inputs and outputs of computations, algorithms that use amplitude amplification methods based on Grover's search algorithm, quantum-enhanced reinforcement learning, quantum annealing, a quantum neural network, a Hidden Quantum Markov Model, etc.

In step 702, metadata extractor 202 of watermarking system 113 extracts the metadata of the quantum machine learning model.

As stated above, "metadata," as used herein, refers to data that provides information about other data. Examples of such extracted metadata include, but not limited to, a degree of entanglement, quantum Fisher information, geometric differences, an expected impact of noise on the quantum machine learning model, a quantum circuit (e.g., quantum circuit 108) expressed in a quantum programming language, and classical model performance parameters on a fixed dataset.

Such metadata information may be extracted from the quantum machine learning model by metadata extractor 202 using various software tools, such as Artificial Intelligence Model Metadata Extractor (AIMMX), AWS® Media Analysis Solution, etc.

In step 703, fingerprint constructor 203 of watermarking system 113 constructs a digital fingerprint of the quantum machine learning model based on the extracted metadata.

As discussed above, a "digital fingerprint," as used herein, maps the extracted metadata to a much shorter bit string.

In one embodiment, fingerprint constructor 203 uses a variety of content from the metadata extracted by metadata extractor 202, such as the degree of entanglement, the quantum Fisher information, the geometric differences, the expected impact of noise on the quantum machine learning model, the quantum circuit (e.g., quantum circuit 108) expressed in a quantum programming language, and classical model performance parameters on a fixed dataset. In one embodiment, fingerprint constructor 203 uses various software tools for selecting such metadata content to be used to generate a digital fingerprint, such as, but not limited to, Elsevier® Fingerprint Engine.

In one embodiment, fingerprint constructor 203 uses a hash algorithm (e.g., MD5) for generating a hash value based on the metadata extracted by metadata extractor 202. Such a hash value may correspond to the digital fingerprint.

In one embodiment, fingerprint constructor 203 uses a physical unclonable function (PUF) (e.g., static random access memory (SRAM) PUF, butterfly PUF) to generate a digital fingerprint based on the metadata extracted by metadata extractor 202.

In step 704, testing engine 204 of watermarking system 113 performs hardware tests on the hardware (e.g., quantum data plane 103, control and measurement plane 104, control processor plane 105, control processor 106, quantum processor 107) of quantum computer 101 (used to develop the quantum machine learning model) to identify the sensitivity of the hardware to angle parameter precision.

As stated above, examples of such tests include, but not limited to, performing N times $2\pi/N$ rotations, measuring fidelity with a ground state, performing forward and backward rotations and performing a combination of rotations along different axes.

Such tests may be performed by testing engine 204 so as to identify the change ($\delta$) in the rotation angle ($\theta$) such that the quantum hardware (e.g., quantum data plane 103, control and measurement plane 104, control processor plane 105, control processor 106, quantum processor 107) cannot guarantee an angle parameter precision at the rotation ($\theta+\delta\theta$). For example, if the quantum hardware (e.g., quantum data plane 103, control and measurement plane 104, control processor plane 105, control processor 106, quantum processor 107) can guarantee precision of only 2 digits after the most significant digit, then the rest of the positions of the angle parameter can be used for watermark storage.

Testing engine 204 may utilize various software tools for performing such tests on the hardware (e.g., quantum data plane 103, control and measurement plane 104, control processor plane 105, control processor 106, quantum processor 107) of quantum computer 101, such as, but not limited to, IQS, QuEST, Qrack, QX Simulator, Quantum++, CHP, Eqcs, LanQ, Q++, etc.

In step 705, watermarking engine 205 of watermarking system 113 merges author information (e.g., author(s) who trained the quantum machine learning model, company name, unique code) with the constructed digital fingerprint to form watermark data 111.

As discussed above, such a merger of information is accomplished by watermarking engine 205 using various software tools, such as, but not limited to, LiGRE's data merging tool, GIS merge tool, Hevo Data, etc.

In step 706, encryption engine 206 of watermarking system 113 encrypts watermark data 111.

As stated above, in one embodiment, encryption engine 206 encrypts watermark data 111 using Advanced Encryption Standard (AES) with a secret key and a binary-to-text encoding scheme (e.g., Base64). An illustration of encrypting watermark data 111 using such a method is shown in FIG. 4.

Referring to FIG. 4, if watermark data 111 included the phrase "Hello World!" 401, it would be encrypted as "?iXUdN©\5cW" 402 via AES 403 which would be encoded as a cyphertext, such as 063 238 088 220 100 209 169 092 053 099 087 139 (see element 404), using Base64 405.

In step 707, encryption engine 206 of watermarking system 113 stores the encrypted watermark data 111 in qubits and/or weights of the quantum machine learning model.

As discussed above, in one embodiment, the entirety of the encrypted watermark data 111 is stored in qubits. Qubits, as used herein, refer to "quantum bits," which correspond to the basic unit of quantum information in which a qubit is a two-state (or two-level) quantum-mechanical system. In one embodiment, the encrypted watermark data 111 is encoded directly into qubits using a data encoding algorithm (e.g., amplitude encoding, basis encoding, angled encoding, etc.). In addition to information encoding on qubits, a set of gates may be added to quantum circuit 108 to produce a unique distribution, which can be used as an additional measure of authenticity.

In one embodiment, such watermark qubits are entangled with regular model qubits so to make them more difficult for a user to determine which qubits are auxiliary (i.e., carry watermark data 111) and which constitute the quantum model. In one embodiment, encryption engine 206 disguises which qubits are model qubits and which are watermark qubits during encryption via a transformation to the overall circuit (e.g., amplitude encoding, basis encoding, angled encoding, etc.).

In one embodiment, encryption engine 206 is further configured to store the entirety of the encrypted watermark data 111 in the weights of the quantum machine learning model. "Weights," as used herein, refer to the digits in the angle parameters that may be used for the storage of watermark data 111, such as the encrypted watermark data 111. For example, referring again to FIG. 4, the exemplary encoded watermark data 111 (see element 404) may be split and substituted into the weights as shown by the arrows 406.

In one embodiment, encryption engine 206 may store a portion of the encrypted watermark data 111 in the weights of the quantum machine learning model and store the other portion of the encrypted watermark data 111 in qubits.

In step 708, testing engine 204 of watermarking system 113 reevaluates the performance of the quantum machine learning model after the storing of the encrypted watermark data 111.

As discussed above, in one embodiment, testing engine 204 may test the performance of the quantum machine learning model to ensure that it is performing satisfactorily after encrypting watermark data 111, and if it performs satisfactorily, may transmit the quantum model, such as to a user of a computing device 117 connected to watermarking system 113, such as via network 114, to use such a model. In one embodiment, satisfactory performance corresponds to a correct prediction rate that exceeds a user-designated percentage.

Testing engine 204 may utilize various software tools for testing the performance of the quantum machine learning model, such as, but not limited to, WEKA®, PyCharm®, Spyder, Testim®, Appvance®, Test.ai®, Functionize, etc.

In step 709, testing engine 204 of watermarking system 113 transmits the quantum model to users, such as to a user of computing device 117 connected to watermarking system 113, such as via network 114, to use such a model if the model performs satisfactorily.

After watermarking quantum machine learning models, the watermark may need to be evaluated or verified, such as discussed below in connection with FIG. 8.

FIG. 8 is a flowchart of a method 800 for evaluating the encrypted watermark data in accordance with an embodiment of the present invention.

Referring to FIG. 8, in conjunction with FIGS. 1-7, in step 801, in the embodiment in which the encrypted watermark data 111 is entirely stored in the weights of the quantum machine learning model or partially stored in the weights of the quantum machine learning model, decryption engine 207 of watermarking system 113 reads the digits from the weights from the known positions that store the encrypted watermark data 111 that form the cyphertext (e.g., cyphertext 404). For example, decryption engine 207 reads the digits of "063 238 088 220 100 209 169 092 053 099 087 139" as shown in FIG. 4. In one embodiment, such known positions are obtained via the same channel as the secret key.

In step 802, decryption engine 207 of watermarking system 113 decodes the cyphertext (e.g., cyphertext 404), such as by decoding the Base64 encoding that formed cyphertext 404 to form the encrypted text (see, e.g., element 402 of FIG. 4).

In step 803, decryption engine 207 of watermarking system 113 decodes the encrypted text (e.g., element 402) with the secret key thereby reconstructing watermark data 111 thereby having the ability to identify the author information (e.g., author(s) who trained the quantum machine learning model, company name, unique code). In this manner, the watermark on the quantum model can be obtained.

In step 804, decryption engine 207 of watermarking system 113 evaluates the quantum machine learning model to confirm agreement between the metadata of the reconstructed watermark data 111 with the original metadata of the quantum machine learning model obtained by metadata extractor 202. As previously discussed, the reconstructed watermark data 111 includes author information and the metadata of the quantum machine learning model that was used for fingerprinting embedded into watermark data 111. If there is agreement between the metadata of the reconstructed watermark data 111 and the original watermark data 111 (i.e., metadata extracted from the quantum machine learning model by metadata extractor 202), then it may be inferred that the decrypted watermark data 111 is correct and valid and that it contains the correct author information. That is, the provenance or record of ownership can be certified.

In the embodiment in which the encrypted watermark data 111 is entirely stored in the qubits, decryption engine 207 reconstructs watermark data 111 using the information as to which qubits store the encrypted watermark data 111 and which qubits constitute the model, where such information may be obtained via the same channel as the secret key. After identifying which qubits store the encrypted watermark data 111, such encrypted watermark data 111 may be decrypted in a similar manner as discussed above. In one embodiment, in order to extract the encrypted watermark data 111 from qubits, decryption engine 207 utilizes the pre-determined input to the model which may be obtained via the same channel as the secret key.

In the embodiment in which a portion of the encrypted watermark data 111 is stored in the weights of the quantum machine learning model and the other portion of the encrypted watermark data 111 is stored in qubits, the particular qubits which store a portion of the encrypted watermark data 111 as well as the particular digits/positions of the angle parameters that store the other portion of the encrypted watermark data 111 (i.e., which weights of the quantum machine learning model store the other portion of the encrypted watermark data 111) may be obtained via the same channel as the secret key. After identifying which qubits and which weights of the quantum machine learning model store the encrypted watermark data 111, such encrypted watermark data 111 may be decrypted in a similar manner as discussed above.

In this manner, the principles of the present disclosure provide a means for watermarking quantum machine learning models developed with a quantum computer by leveraging metadata.

Furthermore, the principles of the present disclosure improve the technology or technical field involving watermarking machine learning models.

As discussed above, currently, a method for watermarking machine learning models involves training the machine learning model based on the original data and a separate watermarking trigger dataset. The watermark may then be verified by querying the trigger set and verifying the labels with respect to the trigger set labels. However, such machine learning models were developed using classical computers as opposed to quantum computers. As a result, the current approaches for watermarking machine learning models are not able to watermark quantum machine learning models in a robust and secure manner due to the differences in how quantum computers process information in comparison to classical computers. That is, such current approaches for watermarking machine learning models are not able to watermark quantum models developed with a quantum computer.

Embodiments of the present disclosure improve such technology by extracting metadata of the quantum model developed with a quantum computer. "Metadata," as used herein, refers to data that provides information about other data. Examples of such extracted metadata include, but not limited to, a degree of entanglement, quantum Fisher information, geometric differences, an expected impact of noise on the quantum model, a quantum circuit expressed in a quantum programming language, and classical model performance parameters on a fixed dataset. A digital fingerprint of the quantum model may then be constructed based on the extracted metadata. A "digital fingerprint," as used herein, maps the extracted metadata to a much shorter bit string. Author information (e.g., author(s) who trained the quantum model, company name, unique code) is then merged with the constructed digital fingerprint to form the watermark data. The watermark data is encrypted, such as by using AES with a secret key and Base64 encoding, and then stored in qubits and/or weights of the quantum model. Qubits, as used herein, refer to "quantum bits," which correspond to the basic unit of quantum information in which a qubit is a two-state (or two-level) quantum-mechanical system. "Weights," as used herein, refer to the digits in the angle parameters that may be used for the storage of the watermark data, such as the encrypted watermark data. In this manner, the principles of the present disclosure provide a means for watermarking quantum models, such as quantum machine learning models, by leveraging metadata. Furthermore, in this manner, there is an improvement in the technical field involving watermarking machine learning models.

In addition to watermarking quantum machine learning models, the principles of the present disclosure prevent the negative effects of any tampering of a quantum model.

A quantum machine learning model may include a large number of parameters θ, which may be compromised, such as by embedding "malicious" data designed to corrupt the quantum machine learning model. "Malicious" data, as used herein, refers to data that when introduced in the quantum machine learning model causes the quantum machine learning model to perform actions undesirable to the owner.

For example, such malicious data may be stored in the quantum machine learning model by first being encoded. The encoded malicious data may then be split into chunks and substituted into the least significant bits or higher decimal places of numbers in the angle parameters, where the quantum hardware (e.g., quantum data plane 103, control and measurement plane 104, control processor plane 105, control processor 106, quantum processor 107) does not guarantee precision of the angle parameter.

Currently, there is not a means for discovering such tampering, let alone preventing the negative effects from such tampering of the quantum machine learning model.

The principles of the present disclosure provide a means for discovering tampering of the quantum machine learning model as well as preventing negative effects from such tampering of the quantum machine learning model as discussed below in connection with FIGS. 9-10.

Figure 9:
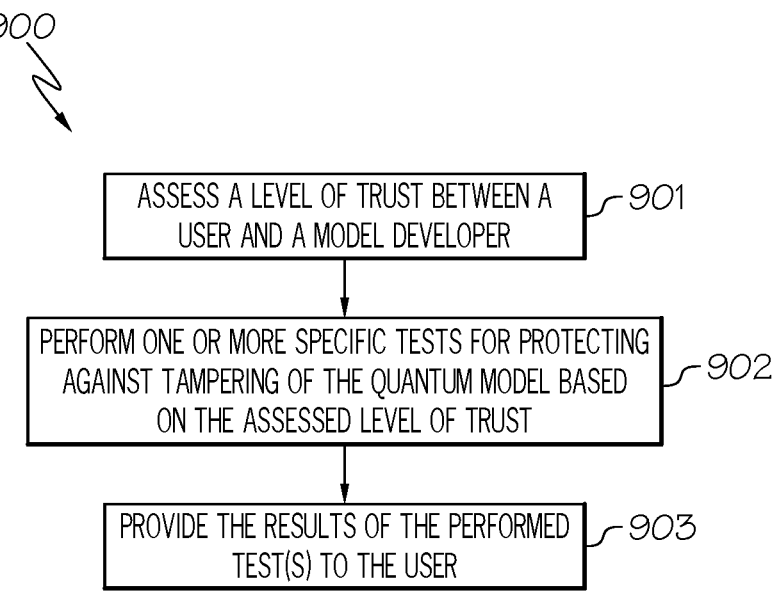
FIG. 9 is a flowchart of a method for preventing negative effects of any tampering of a quantum model in accordance with an embodiment of the present invention.

FIG. 9 is a flowchart of a method for preventing negative effects of any tampering of a quantum model. FIG. 10 is a flowchart of a method for testing the quantum model to protect against tampering of the quantum model.

As stated above, FIG. 9 is a flowchart of a method 900 for preventing negative effects of any tampering of a quantum model, such as a quantum machine learning model, in accordance with an embodiment of the present disclosure.

Referring to FIG. 9, in conjunction with FIGS. 1-6, in step 901, trust analyzer 208 of watermarking system 113 assesses a level of trust between a user (e.g., user of computing device 117) and the model developer, who developed the quantum machine learning model to be used by the user.

As stated above, in one embodiment, such a level of trust is provided to trust analyzer 208 directly by the user, such as by the user inputting such a level of trust on the user interface of computing device 117 via various input means which is transmitted to watermarking system 113 via network 114. In one embodiment, such a level of trust is based on various criteria, such as, but not limited to, whether the model developer organization is new, whether the model developer organization has supplied prior quantum models to the user, country of origin of the model developer organization, complexity of the quantum model in comparison to other quantum models, level of detail in model description/metadata, etc.

For example, if the model developer organization is new, then the level of trust between the user and the model developer is said to be a low level of trust. If, on the other hand, the model developer organization has been established for a long period of time (e.g., twenty years), then the level of trust between the user and the model developer may be said to be a high level of trust. In one embodiment, such information regarding the date of establishment of the model developer organization is obtained directly from the user, which may be inputted by the user to computing device 117 via various input means which is transmitted to watermarking system 113 via network 114.

In another example, if the model developer organization has supplied a user-designated number of prior quantum models to the user (e.g., user of computing device 117), then the level of trust between the user and the model developer may be said to be a high level of trust. If, on the other hand, the model developer organization has not previously supplied a quantum model to the user, or has supplied a relatively few number of quantum models to the user, then the level of trust between the user and the model developer may be said to be a low level of trust. In one embodiment, such information regarding the number of quantum models previously provided to the user by the model developer organization is obtained directly from the user, which may be inputted by the user to computing device 117 via various input means which is transmitted to watermarking system 113 via network 114.

In a further example, the country of origin of the model developer organization may affect the level of trust between the user and the model developer. For instance, if the country of origin of the model developer organization differs from the user (e.g., user of computing device 117), then the level of trust between the user and the model developer may be said to be a low level of trust. If, on the other hand, the country of origin of the model developer organization is the same as the user (e.g., user of computing device 117), then the level of trust between the user and the model developer may be said to be a high level of trust. In one embodiment, such information regarding the country of origin of the model developer organization as well as the country of origin of the user may be inputted by the user to computing device 117 via various input means which is transmitted to watermarking system 113 via network 114.

In another example, trust analyzer 208 determines the level of trust between the user (e.g., user of computing device 117) and the model developer based on the complexity of the quantum model in comparison to other quantum models. For instance, the less complex is the quantum model (e.g., quantum machine learning model) in question, the higher the level of trust between the user and the model developer and vice-versa. In one embodiment, trust analyzer 208 determines the complexity of the quantum machine learning model in question based on the complexity of the logical circuit and vector of parameters representing the trained quantum machine learning model, where the logical circuit and vector parameters may be provided to trust analyzer 208 by metadata extractor 202. The greater the complexity of the logical circuit and vector of parameters, the greater the complexity of the quantum model is said to be and vice-versa. In one embodiment, the complexity of the logical circuit may be based on the size or depth of the logical circuit, which may be determined using various software tools, such as logic analyzers (e.g., Logic Analyzer by Tektronix®). The greater the size or depth of the logical circuit, the greater the complexity of the quantum model and vice-versa. In one embodiment, the complexity of the vector of parameters may be based on the number of parameters, which may be determined using various software tools, such as Simulink® Design Optmization™, etc. The greater the number of parameters, the greater the complexity of the quantum model and vice-versa. In one embodiment, trust analyzer 208 determines the complexity of the quantum machine learning model in question based on the number of elementary instructions and physical qubits generated by transpiler 112. The greater the number of elementary instructions and physical qubits, the greater the complexity of the quantum model is said to be and vice-versa.

In a further example, trust analyzer 208 determines the level of trust between the user (e.g., user of computing device 117) and the model developer based on the level of detail in the model description/metadata. In one embodiment, such a level of detail is based on the number of different types of metadata (e.g., degree of entanglement, quantum Fisher information, geometric differences, etc.) provided by metadata extractor 202 to trust analyzer 208 to be used to determine the level of trust between the user (e.g., user of computing device 117) and the model developer. The greater the level of detail in the model description/metadata, the greater the level of trust between the user and the model developer and vice-versa.

In step 902, trust analyzer 208 instructs watermarking system 113 to perform one or more specific tests for protecting against tampering of the quantum machine learning model based on the assessed level of trust between the user and the model developer. For example, the test to validate the quantum machine learning model or the test to validate the watermark data, such as watermark data 111, or the test to validate the digital fingerprint may not be used to discover tampering of the quantum machine learning model in a high trust environment but would be used in a low trust environment. Furthermore, particular tests may be performed based on whether training data is available. For example, if no training data is available, then retraining the quantum machine learning model to prevent the negative effects of any tampering would not be performed. Instead, the quantum machine learning model may be updated by rounding and truncating parameter values to prevent the negative effects of any tampering. Such tests to discover tampering of the quantum machine learning model as well as to prevent the negative effects from such tampering are discussed below in connection with FIG. 10.

In step 903, trust analyzer 208 of watermarking system 113 provides the result of the performed test(s) to the user (e.g., user of computing device 117). For example, in one embodiment, such results may be provided to the user electronically, such as via an electronic message, sent to computing device 117 via network 114.

Figure 10:
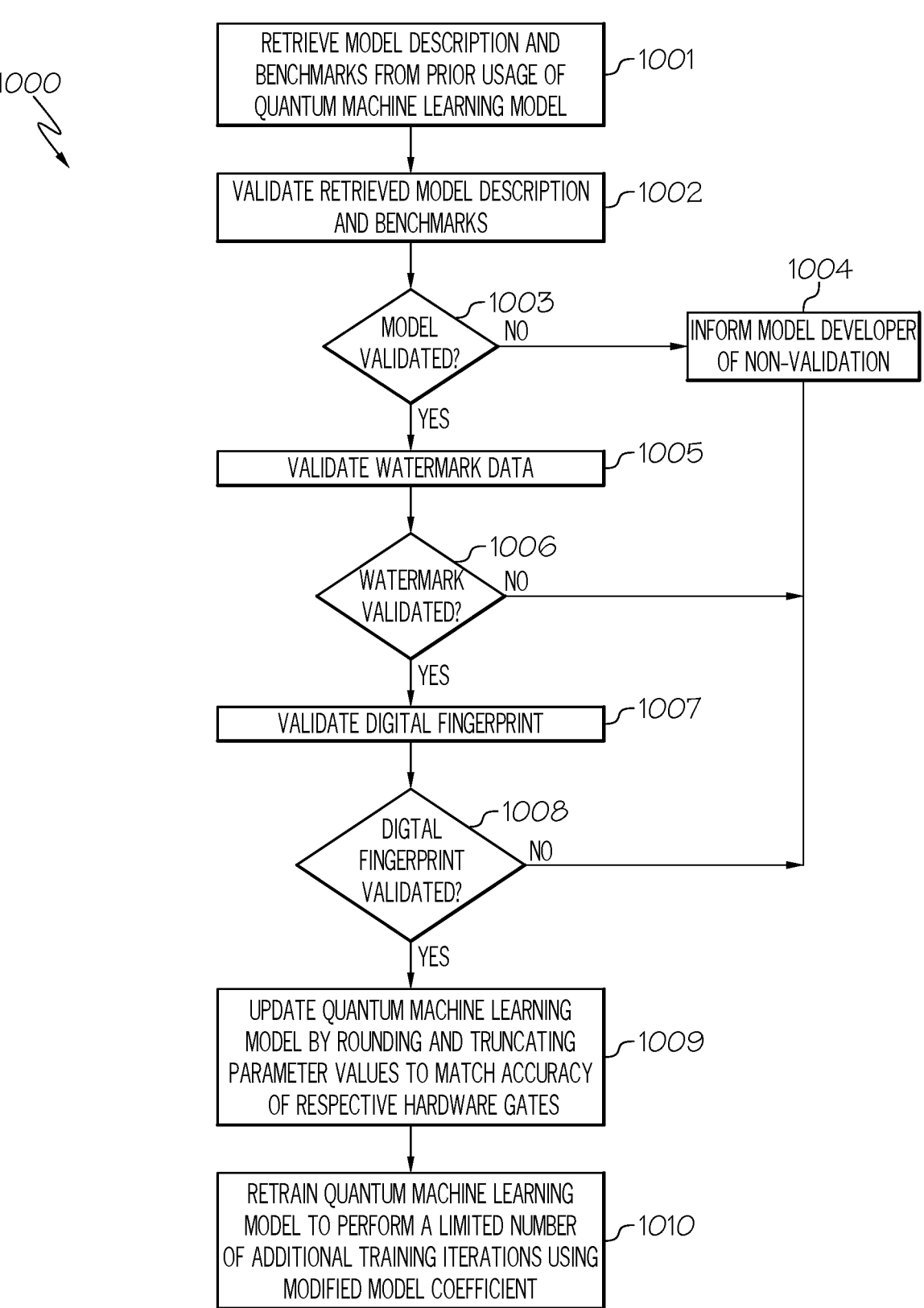
FIG. 10 is a flowchart of a method for testing the quantum model to protect against tampering of the quantum model in accordance with an embodiment of the present invention.

Referring now to FIG. 10, FIG. 10 is a flowchart of a method 1000 for testing the quantum model to protect against tampering of the quantum model, such as the quantum machine learning model, in accordance with an embodiment of the present invention.

It is noted for clarity that while the following discusses these tests as being performed in a certain order that such tests may be performed in a different order than presented in FIG. 10. Furthermore, it is noted for clarity that not every test will be performed on the quantum machine learning model. For example, based on the level of trust between the user and the model developer, only a subset of these tests may be performed on the quantum machine learning model, where such a subset may include a single test. Alternatively, each of these tests may be performed on the quantum machine learning model in certain situations, such as in a low-trust environment in which training data is readily available.

Referring now to FIG. 10, in conjunction with FIGS. 1-6 and 9, in step 1001, testing engine 204 of watermarking system 113 retrieves the model description and benchmarks from metadata extractor 202, where such benchmarks were obtained from prior usage of the quantum machine learning model.

As stated above, the "model description," as used herein, refers to the documentation describing the quantum model, such as prepared by the model developer organization. The "benchmarks," as used herein, refer to prior metrics, results, calculations, etc. attributed to a prior performance of the quantum machine learning model. In one embodiment, the model description and benchmarks are obtained from metadata extractor 202. An example of the model description is a description of the quantum model provided by the author. Examples of such benchmarks include predictions, metrics (e.g., area under the curve (AUC)), quantum and classical properties (e.g., level of entanglement, model capacity, etc.), etc.

In step 1002, testing engine 204 of watermarking system 113 validates the retrieved model description and benchmarks.

As discussed above, in one embodiment, the model description is validated by determining if the documentation applies to the latest model update. For instance, the latest model update may be identified by a version number, and if such a version number is not identified in the documentation, then it may be inferred that the documentation was not updated during the latest model update. In one embodiment, testing engine 204 utilizes natural language processing to identify the model update or version number in the received documentation. In one embodiment, the latest version number of the quantum model may be obtained by testing engine 204 via the metadata extracted by metadata extractor 202, which may include the version number of the quantum machine learning model.

In one embodiment, the benchmarks are validated by running the quantum machine learning model by testing engine 204 and comparing the benchmarks obtained from running the quantum machine learning model with the retrieved benchmarks (obtained from metadata extractor 202).

If there is no discrepancy with the model description (e.g., the model description was updated during the latest model update) or the benchmarks (e.g., metrics obtained from running the quantum machine learning model do not differ from the metrics obtained from metadata extractor 202 from a prior usage of the quantum machine learning model), then the quantum machine learning model is said to be validated. If, however, there is a discrepancy with the model description (e.g., the model description was not updated during the latest model update) or the benchmarks (e.g., metrics obtained from running the quantum machine learning model differ from the metrics obtained from metadata extractor 202 from a prior usage of the quantum machine learning model), then the quantum machine learning model is said not to be validated.

In step 1003, a determination is made by testing engine 204 of watermarking system 113 as to whether the quantum machine learning model is validated.

If the quantum machine learning model is not validated, then, in step 1004, testing engine 204 of watermarking system 113 informs the model developer of non-validation, such as via electronic communication. For instance, a computing device (similar to computing device 117) of the model developer may be connected to watermarking system 113 via a network, such as network 114. As a result, an electronic notification may be sent to the computing device of the model developer by testing engine 204 of watermarking system 113 via a network, such as network 114. In this manner, tampering of the quantum model may be discovered and the negative effects of such tampering would be prevented.

If, however, the quantum machine learning model is validated, then, in step 1005, decryption engine 207 of watermarking system 113 validates watermark data 111.

As stated above, in one embodiment, decryption engine 207 validates the reconstructed watermark data 111. Furthermore, as previously discussed, decryption engine 207 is configured to reconstruct watermark data 111 from the encrypted version of watermark data 111 to identify the author information (e.g., author(s) who trained the quantum machine learning model, company name, unique code).

In one embodiment, decryption engine 207 validates the reconstructed watermark data 111 by comparing such watermark data 111 against the watermark data 111 formed by watermarking engine 205. As previously discussed, watermarking engine 205 is configured to merge author information (e.g., author(s) who trained the quantum machine learning model, company name, unique code) with the constructed digital fingerprint to form watermark data 111.

In one embodiment, if there is a discrepancy between the reconstructed watermark data 111 with the watermark data 111 formed by watermarking engine 205, then the watermark data 111 may be said to not be validated. If, however, there is no discrepancy (i.e., there is agreement) between the reconstructed watermark data 111 with the watermark data 111 formed by watermarking engine 205, then the watermark data 111 may be said to be validated.

In one embodiment, decryption engine 207 utilizes a software tool, such as Compare by Dispatch, Sisense®, Thoughtspot®, Qlik, Tableau®, IBM® Cognos®, etc. to identify any differences between the reconstructed watermark data 111 with the watermark data 111 formed by watermarking engine 205.

In step 1006, a determination is made by decryption engine 207 of watermarking system 113 as to whether the watermark data 111 is validated.

If watermark data 111 is not validated, then, in step 1004, decryption engine 207 of watermarking system 113 informs the model developer of non-validation, such as via electronic communication. For instance, a computing device (similar to computing device 117) of the model developer may be connected to watermarking system 113 via a network, such as network 114. As a result, an electronic notification may be sent to the computing device of the model developer by decryption engine 207 of watermarking system 113 via a network, such as network 114. In this manner, tampering of the quantum model may be discovered and the negative effects of such tampering would be prevented.

If, however, watermark data 111 is validated, then, in step 1007, decryption engine 207 of watermarking system 113 validates the digital fingerprint.

As discussed above, watermark data 111 includes both the digital fingerprint and the author information (e.g., author(s) who trained the quantum machine learning model, company name, unique code). Upon decryption engine 207 reconstructing watermark data 111, the digital fingerprint of the reconstructed watermark data 111 may be compared against the digital fingerprint of the quantum machine learning model constructed by fingerprint constructor 203. As previously discussed, fingerprint constructor 203 is configured to construct a digital fingerprint of the quantum machine learning model based on the extracted metadata from metadata extractor 202. In one embodiment, decryption engine 207 utilizes a software tool, such as Compare by Dispatch, Sisense®, Thoughtspot®, Qlik, Tableau®, IBM® Cognos®, etc. to identify any differences between the digital fingerprint of the reconstructed watermark data 111 with the digital fingerprint constructed by fingerprint constructor 203.

If there is agreement between the digital fingerprint of the reconstructed watermark data 111 with the digital fingerprint constructed by fingerprint constructor 203, then the digital fingerprint may be said to be validated. If, however, there is no agreement between the digital fingerprint of the reconstructed watermark data 111 with the digital fingerprint constructed by fingerprint constructor 203, then the digital fingerprint may be said to not be validated.

In step 1008, a determination is made by decryption engine 207 of watermarking system 113 as to whether the digital fingerprint is validated.

If the digital fingerprint is not validated, then, in step 1004, decryption engine 207 of watermarking system 113 informs the model developer of non-validation, such as via electronic communication. For instance, a computing device (similar to computing device 117) of the model developer may be connected to watermarking system 113 via a network, such as network 114. As a result, an electronic notification may be sent to the computing device of the model developer by decryption engine 207 of watermarking system 113 via a network, such as network 114. In this manner, tampering of the quantum model may be discovered and the negative effects of such tampering would be prevented.

If, however, the digital fingerprint is validated, then, in step 1009, testing engine 204 of watermarking system 113 updates the quantum machine learning model. In one embodiment, testing engine 204 updates the quantum machine learning model by rounding and truncating parameter values to match the accuracy of the respective hardware gates.

As discussed above, in one embodiment, testing engine 204 runs experiments on the quantum hardware (e.g., quantum data plane 103, control and measurement plane 104, control processor plane 105, control processor 106, quantum processor 107) to evaluate the accuracy. For example, in connection with the RY($\theta$) gate, testing engine 204 may run 3 rotations ($2\pi/3$) over the Y axis and introduce a small deviation ($\Delta\theta$). For instance, if $\Delta\theta=0$, then the ground state is measured. It is noted that in the presence of noise, the ground state measurement may not be possible all the time. Next, the deviation may be changed in a small region (e.g., $[0, \pi/8]$) and the result is measured. Testing engine 204 may utilize various software tools for running such experiments on the hardware (e.g., quantum data plane 103, control and measurement plane 104, control processor plane 105, control processor 106, quantum processor 107) of quantum computer 101, such as, but not limited to, IQS, QuEST, Qrack, QX Simulator, Quantum++, CHP, Eqcs, LanQ, Q++, etc.

In one embodiment, the results of such a calculation represent frequencies of |0> and |1> states attached to the value of $\Delta\theta$. Next, testing engine 204 may construct tables (e.g., 2×2 tables) of the results comparing the ground states and the calculated p-values (null hypothesis) using the Fischer exact test (statistical significance test used in the analysis of contingency tables). In one embodiment, such calculations are run by testing engine 204 using IBM® Cognos®. An exemplary illustration of the results is shown in FIG. 5. FIG. 5 illustrates an exemplary table 500 (top 20 rows) of the results comparing the ground states and the calculated p-values (null hypothesis) using the Fischer exact test in accordance with an embodiment present invention.

Referring to FIG. 5, table 500 includes a column 501 of row numbers, a column 502 for the values of $\Delta\theta$, and a column 503 for the p-values. As shown in row 7, the p-value is constantly<0.05, which indicates statistical significance of the result difference from the ground state. As a result, it can be concluded that the RY($\theta$) gate is only sensitive to about 2 digits after the decimal point. Consequently, such parameter values may be rounded to 2 digits after the decimal point and the remaining digits in the parameter values may be truncated. By repeating such a process for all the parameters, the integrity of any embedded "malicious" data will be broken while leaving model performance on such noisy hardware intact. This is because such embedded "malicious" data may reside in those digits of the parameter values that were truncated. In this manner, tampering of the quantum model may be discovered and the negative effects of such tampering would be prevented.

In step 1010, testing engine 204 of watermarking system 113 retrains the quantum machine learning model to perform a limited number of additional training iterations using modified model coefficients. Testing engine 204 may utilize various software tools retraining the quantum machine learning model, such as, but not limited to, WEKA®, PyCharm®, Spyder, Testim®, Appvance®, Test.ai®, Functionize, etc.

As stated above, in one embodiment, such modified model coefficients are modified in the digits of the angle parameters where precision is not guaranteed by the quantum hardware (e.g., quantum data plane 103, control and measurement plane 104, control processor plane 105, control processor 106, quantum processor 107). In one embodiment, in low-trust environments (i.e., where there is a low level of trust between the user and the model developer), the quantum machine learning model may be retrained to perform a limited number of additional training iterations. In one embodiment, the existing model coefficients are only slightly changed. In the scenario in which the "malicious" data is introduced into the quantum model by being split into chunks, even a small change in the parameter values can break the integrity of the embedded malware. For example, by retraining the quantum machine learning model, the $\theta$ parameter may change its value from 0.469319023958311 to 0.469404036749485. While such a change is less than 0.1% of its original value, the malware information embedded in the parameter would be lost. In this manner, tampering of the quantum model may be discovered and the negative effects of such tampering would be prevented.

As previously discussed, the number and types of tests to be performed by watermarking system 113 to discover tampering of the quantum model as well as to prevent the negative effects of any tampering of the quantum model is based on the level of trust between the user (e.g., user of computing device 117) and the model developer. For example, in a very low-trust environment, the quantum machine learning model may be both updated and retrained as discussed above. In one embodiment, the choice as to whether the updating and/or retraining of the quantum machine learning model is performed (determined by trust analyzer 208) depends on the availability of the training data and the training mechanism. If no training data is available, then only the updating of the quantum machine learning model may need to be performed. If, however, at least some training data is available, including artificially generated, then the quantum machine learning model may be retrained in addition to possibly updating the quantum machine learning model.

In higher-trust environments, the model description and even watermark information may be shared among the model developer and the user. In lower-trust environments, such information would not be shared among the model developer and the user.

In one embodiment, the different types of hardware utilized by the model developer and the user may be taken into consideration in detecting tampering of the quantum machine learning model, such as via the noise profiles of such hardware. The impact of the modification on the result will remain constant while the hardware noise may fluctuate. A protocol may be devised by which the data is transferred via qubits from the source and the results are transferred to the source. In one embodiment, state fidelity measurements are used as a measure of closeness. Measurements that are indicative of a lack of closeness may be indicative of tampering of the quantum machine learning model. This process may be repeated for several days with different qubit configurations and devices.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

In one embodiment of the present disclosure, a computer-implemented method for watermarking quantum models comprises determining a precision for a parameter of a quantum model on a quantum computer. The method further comprises truncating the parameter based on the determined precision. The method additionally comprises appending a watermark in one or more positions of truncated portion of the truncated parameter.

Additionally, in one embodiment of the present disclosure, the method further comprises extracting metadata from the quantum model developed with the quantum computer. The method additionally comprises constructing a digital fingerprint of the quantum model based on the extracted metadata.

Furthermore, in one embodiment of the present disclosure, the method additionally comprises merging author information with the constructed digital fingerprint to form the watermark.

Additionally, in one embodiment of the present disclosure, the method further comprises encrypting the watermark.

Furthermore, in one embodiment of the present disclosure, the encrypted watermark is encoded directly into qubits as watermark qubits using a data encoding algorithm, where the watermark qubits are entangled with model qubits.

Additionally, in one embodiment of the present disclosure, the encryption disguises which qubits are the model qubits and which are the watermark qubits.

Furthermore, in one embodiment of the present disclosure, the precision for the parameter of the quantum model on the quantum computer is determined by performing tests on hardware of the quantum computer to identify sensitivity of the hardware to angle parameter precision.

Additionally, in one embodiment of the present disclosure, the tests comprise one or more of the following: performing N times $2\pi/N$ rotations, where N is a positive integer number, measuring fidelity with a ground state, performing forward and backward rotations and performing a combination of rotations along different axes.

Other forms of the embodiments of the method described above are in a system and in a computer program product.

In one embodiment of the present disclosure, a computer-implemented method for preventing negative effects of any tampering of a quantum model comprises assessing a level of trust between a user and a model developer who developed the quantum model to be used by the user. The method further comprises performing one or more specific tests for protecting against tampering of the quantum model based on the assessed level of trust between the user and the model developer. The method additionally comprises providing a result of the performed one or more specific tests to the user.

Additionally, in one embodiment of the present disclosure, the one or more specific tests comprise one or more of the following: validating a model description and benchmarks of the quantum model, validating watermark data stored in the quantum model, and validating a digital fingerprint of the quantum model constructed from metadata of the quantum model.

Furthermore, in one embodiment of the present disclosure, one of the one or more specific tests comprises updating the quantum mode by rounding and truncating parameter values to match accuracy of respective hardware gates.

Additionally, in one embodiment of the present disclosure, one of the one or more specific tests comprises retraining the quantum model to perform a limited number of additional training iterations using modified model coefficients.

Other forms of the embodiments of the method described above are in a system and in a computer program product.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for watermarking quantum models, the method comprising:

extracting metadata from a quantum model developed with a quantum computer;

constructing a digital fingerprint of said quantum model based on said extracted metadata;

merging author information with said constructed digital fingerprint to form watermark data;

encrypting said watermark data; and storing said encrypted watermark in one or more of the following: qubits and weights of said quantum model.

2. The method as recited in claim 1 further comprising: performing tests on hardware of said quantum computer to identify sensitivity of said hardware to angle parameter precision.

3. The method as recited in claim 2, wherein positions of one or more angle parameters that are not utilized for said angle parameter precision correspond to said weights of said quantum model that are used to store at least a subset of said encrypted watermark data.

4. The method as recited in claim 1, wherein said extracted metadata comprises one or more of the following: a degree of entanglement, quantum Fisher information, geometric differences, an expected impact of noise on said quantum model, a quantum circuit expressed in a quantum programming language, and classical model performance parameters on a fixed dataset.

5. The method as recited in claim 4, wherein said encrypted watermark is encoded directly into qubits as watermark qubits using a data encoding algorithm, wherein said watermark qubits are entangled with model qubits.

6. The method as recited in claim 5, wherein said encryption disguises which qubits are said model qubits and which are said watermark qubits.

7. The method as recited in claim 2, wherein said tests comprise one or more of the following: performing N times $2\pi/N$ rotations, where N is a positive integer number, measuring fidelity with a ground state, performing forward and backward rotations and performing a combination of rotations along different axes.

8. A computer program product for watermarking quantum models, the computer program product comprising one or more computer readable storage mediums having program code embodied therewith, the program code comprising programming instructions for:
   extracting metadata from a quantum model developed with a quantum computer;
   constructing a digital fingerprint of said quantum model based on said extracted metadata;
   merging author information with said constructed digital fingerprint to form watermark data;
   encrypting said watermark data; and
   storing said encrypted watermark in one or more of the following: qubits and weights of said quantum model.

9. The computer program product as recited in claim 8, wherein the program code further comprises the programming instructions for:
   performing tests on hardware of said quantum computer to identify sensitivity of said hardware to angle parameter precision.

10. The computer program product as recited in claim 9, wherein positions of one or more angle parameters that are not utilized for said angle parameter precision correspond to said weights of said quantum model that are used to store at least a subset of said encrypted watermark data.

11. The computer program product as recited in claim 9, wherein said tests comprise one or more of the following: performing N times $2\pi/N$ rotations, where N is a positive integer number, measuring fidelity with a ground state, performing forward and backward rotations and performing a combination of rotations along different axes.

12. The computer program product as recited in claim 8, wherein said extracted metadata comprises one or more of the following: a degree of entanglement, quantum Fisher information, geometric differences, an expected impact of noise on said quantum model, a quantum circuit expressed in a quantum programming language, and classical model performance parameters on a fixed dataset.

13. The computer program product as recited in claim 12, wherein said encrypted watermark is encoded directly into qubits as watermark qubits using a data.

14. The computer program product as recited in claim 13, wherein said encryption disguises which qubits are said model qubits and which are said watermark qubits.

15. A system, comprising:
   a memory for storing a computer program for performing a gauging logical measurement on a quantum computer; and
   a processor connected to said memory, wherein said processor is configured to execute program instructions of the computer program comprising:
      extracting metadata from a quantum model developed with a quantum computer;
      constructing a digital fingerprint of said quantum model based on said extracted metadata;
      merging author information with said constructed digital fingerprint to form watermark data;
      encrypting said watermark data; and
      storing said encrypted watermark data in one or more of the following: qubits and weights of said quantum model.

16. The system as recited in claim 15, wherein the program instructions of the computer program further comprise:
   performing tests on hardware of said quantum computer to identify sensitivity of said hardware to angle parameter precision.

17. The system as recited in claim 16, wherein positions of one or more angle parameters that are not utilized for said angle parameter precision correspond to said weights of said quantum model that are used to store at least a subset of said encrypted watermark data.

18. The system as recited in claim 15, wherein said extracted metadata comprises one or more of the following: a degree of entanglement, quantum Fisher information, geometric differences, an expected impact of noise on said quantum model, a quantum circuit expressed in a quantum programming language, and classical model performance parameters on a fixed dataset.

19. The system as recited in claim 18, wherein said encrypted watermark is encoded directly into qubits as watermark qubits using a data encoding algorithm, wherein said watermark qubits are entangled with model qubits.

20. The system as recited in claim 19, wherein said encryption disguises which qubits are said model qubits and which are said watermark qubits.

\* \* \* \* \*